(12) United States Patent
Rafalko

(10) Patent No.: US 11,727,400 B2
(45) Date of Patent: *Aug. 15, 2023

(54) TELECOMMUNICATION SYSTEM AND METHOD FOR SETTLING SESSION TRANSACTIONS

(71) Applicant: Noah Rafalko, Holbrook, MA (US)

(72) Inventor: Noah Rafalko, Holbrook, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/892,446

(22) Filed: Aug. 22, 2022

(65) Prior Publication Data

US 2022/0398576 A1 Dec. 15, 2022

Related U.S. Application Data

(63) Continuation of application No. 17/479,909, filed on Sep. 20, 2021, now Pat. No. 11,423,399, which is a
(Continued)

(51) Int. Cl.
*G06F 15/16* (2006.01)
*G06Q 20/38* (2012.01)
(Continued)

(52) U.S. Cl.
CPC ......... *G06Q 20/3829* (2013.01); *G06Q 20/36* (2013.01); *G06Q 20/401* (2013.01); *G06Q 40/04* (2013.01); *H04L 9/0637* (2013.01); *H04L 9/3236* (2013.01); *H04L 9/3247* (2013.01); *G06Q 2220/00* (2013.01); *H04L 9/50* (2022.05); *H04L 2209/56* (2013.01)

(58) Field of Classification Search
CPC .. G06Q 20/3829; G06Q 20/36; G06Q 20/401; G06Q 40/04; H04L 9/0637; H04L 9/3247; H04L 2209/38; H04L 2209/56
USPC ................................ 709/201, 203, 223, 227
See application file for complete search history.

(56) References Cited

U.S. PATENT DOCUMENTS 9,124,650 B2 9/2015 Maharajh
9,813,245 B2 11/2017 Le Saint et al.
(Continued)

FOREIGN PATENT DOCUMENTS

AU 2022200068 2/2022
CA 3101638 12/2019
(Continued)

OTHER PUBLICATIONS

Catering the Telecom Conundrum of Revenue Leakage: Blockchain—A Business Paradigm 2017.
(Continued)

*Primary Examiner* — Liang Che A Wang
(74) *Attorney, Agent, or Firm* — Carlton Fields, PA; J. Coy Stull; William G. Giltinan

(57) ABSTRACT

A system for validating communications sessions among clients utilizes a ledger administration server to validate requests for communications sessions using smart contracts and recorded on a distributed ledger, with at least one session validation server capable of validating requested communications sessions communicating with said ledger administration server via messages, said communications sessions being validated and initiated in near real-time.

14 Claims, 8 Drawing Sheets

Related U.S. Application Data continuation of application No. 16/986,905, filed on Aug. 6, 2020, now Pat. No. 11,127,003, which is a continuation of application No. 16/626,446, filed as application No. PCT/US2019/035222 on Jun. 3, 2019, now Pat. No. 10,740,754.

(60) Provisional application No. 62/736,222, filed on Sep. 25, 2018, provisional application No. 62/680,221, filed on Jun. 4, 2018.

(51) Int. Cl.
  G06Q 20/36  (2012.01)
  G06Q 20/40  (2012.01)
  G06Q 40/04  (2012.01)
  H04L 9/06  (2006.01)
  H04L 9/32  (2006.01)
  H04L 9/00  (2022.01)

(56) References Cited

U.S. PATENT DOCUMENTS

| | | | |
|---|---|---|---|
| 9,849,364 | B2 | 12/2017 | Tran |
| 9,867,043 | B2 | 1/2018 | Aissi |
| 9,934,138 | B1 | 4/2018 | Bache et al. |
| 9,935,772 | B1 | 4/2018 | Madisetti |
| 10,057,243 | B1* | 8/2018 | Kumar .................. H04L 9/321 |
| 10,491,578 | B1* | 11/2019 | Hebert .................. H04L 9/16 |
| 10,740,754 | B2 | 8/2020 | Rafalko |
| 11,023,968 | B2* | 6/2021 | Arnold .................. G06Q 40/04 |
| 11,127,003 | B2 | 9/2021 | Rafalko |
| 11,423,399 | B2 | 8/2022 | Rafalko |
| 2007/0039879 | A1* | 2/2007 | Nunn .................. B09B 3/00 210/605 |
| 2007/0160183 | A1* | 7/2007 | Shaw .................. H04L 12/14 379/114.03 |
| 2007/0220251 | A1 | 9/2007 | Rosenberg et al. |
| 2012/0311684 | A1 | 12/2012 | Paulsen et al. |
| 2014/0259937 | A1 | 9/2014 | Louie et al. |
| 2014/0344015 | A1 | 11/2014 | Puertolas-Montanes |
| 2015/0120539 | A1* | 4/2015 | Amancherla .......... G06Q 20/40 705/41 |
| 2015/0170112 | A1 | 6/2015 | DeCastro |
| 2015/0278820 | A1 | 10/2015 | Meadows |
| 2015/0379510 | A1 | 12/2015 | Smith |
| 2016/0012465 | A1 | 1/2016 | Sharp |
| 2016/0217532 | A1 | 7/2016 | Slavin |
| 2016/0260171 | A1 | 9/2016 | Ford et al. |
| 2016/0301525 | A1* | 10/2016 | Canard ............... H04L 9/0643 |
| 2016/0330034 | A1 | 11/2016 | Back et al. |
| 2017/0046792 | A1 | 2/2017 | Haldenby et al. |
| 2017/0076306 | A1 | 3/2017 | Snider et al. |
| 2017/0103468 | A1 | 4/2017 | Orsini et al. |
| 2017/0124556 | A1* | 5/2017 | Seger, II .................. H04L 69/40 |
| 2017/0132621 | A1 | 5/2017 | Miller et al. |
| 2017/0140408 | A1 | 5/2017 | Wuehler |
| 2017/0180469 | A1 | 6/2017 | Ford et al. |
| 2017/0220815 | A1 | 8/2017 | Ansari et al. |
| 2017/0228734 | A1 | 8/2017 | Kurian |
| 2017/0243025 | A1 | 8/2017 | Kurian |
| 2017/0279774 | A1 | 9/2017 | Booz et al. |
| 2017/0287090 | A1 | 10/2017 | Hunn et al. |
| 2017/0295232 | A1* | 10/2017 | Curtis ..................... G06F 16/27 |
| 2017/0352027 | A1 | 12/2017 | Zhang et al. |
| 2018/0039667 | A1 | 2/2018 | Pierce et al. |
| 2018/0040007 | A1 | 2/2018 | Lane et al. |
| 2018/0048738 | A1 | 2/2018 | Hinds |
| 2018/0075453 | A1 | 3/2018 | Durvasula et al. |
| 2018/0075527 | A1 | 3/2018 | Nagla et al. |
| 2018/0089651 | A9 | 3/2018 | Lund et al. |
| 2018/0096360 | A1 | 4/2018 | Christidis |
| 2018/0096752 | A1 | 4/2018 | Ovalle |
| 2018/0097779 | A1 | 4/2018 | Karame et al. |
| 2018/0097780 | A1 | 4/2018 | Olivier et al. |
| 2019/0080392 | A1* | 3/2019 | Youb ..................... G06F 21/64 |
| 2019/0158469 | A1* | 5/2019 | Gonzalez ............. H04B 17/318 |

FOREIGN PATENT DOCUMENTS

| | | |
|---|---|---|
| IN | 202047056017 | 12/2020 |
| WO | WO2017006431 A1 | 4/2017 |
| WO | WO2017145019 A1 | 8/2017 |
| WO | WO2017187397 A1 | 11/2017 |
| WO | WO2018019364 A1 | 2/2018 |
| WO | WO2018032371 A1 | 2/2018 |
| WO | WO2018053413 A1 | 3/2018 |
| WO | WO2018059334 A1 | 4/2018 |
| WO | WO2019236482 A1 | 12/2019 |

OTHER PUBLICATIONS

Polyzos, George C., and Nikos Fotiou. Blockchain-assisted Information Distribution for the Internet of Things. 2017 IEEE International Conference on Information Reuse and Integration (IRI). IEEE, 2017. (Located via Google Scholar, free copy available at https://mm.aueb.gr/publications/2017._IICPS.pdf) 2017.

Skowronski, Ratal. On the applicability of the GRIDNET protocol to Smart Grid environments, (https://mm.aueb.gr/publications/2017_IICPS.pdf) 2018.

Chakravorty, Antorweep, and Chunming Rong. Ushare: user controlled social media based on blockchain. Proceedings of the 11th International Conference on Ubiquitous Information Management and Communication. ACM, 2017. (https://www.researchgate.net/publication/312211808_Ushare_user_controlled_social_media_based_on_blockchain.

"Hadoop: Bitcoin-Blockchain—A New Era Needed in Distributed Computing." In: International Journal of Computer Applications. <https://pdfs.semanticscholar.org/4811/71bbf7a2a1a385a3811312c86e97b0f9dde9.pdf> Nov. 30, 2016.

International Search Report dated Aug. 19, 2019.

Government of India Examination Report dated Jan. 6, 2022.

* cited by examiner

TELECOMMUNICATION SYSTEM AND METHOD FOR SETTLING SESSION TRANSACTIONS This application is a continuation of U.S. Ser. No. 17/479,909 filed on Sep. 20, 2021, which claims priority to U.S. Ser. No. 16/986,905 filed on Aug. 6, 2020, which claims priority to U.S. Ser. No. 16/626,446 filed on Dec. 24, 2019, which claims priority to International Application No. PCT/US2019/035222 filed on Jun. 3, 2019, which claims priority to provisional application No. 62/680,221 filed on Jun. 4, 2018, and provisional application No. 62/736,222 filed on Sep. 25, 2018, each of which is hereby incorporated in its entirety.

BACKGROUND

The processing of communications sessions, in particular within the telecommunications market, can involve substantial authorization risk because such sessions generally comprise two parts. For example, a session in which a first party initiates a communication to a second party in exchange for credits may be processed as (i) the transfer of credits from the first to the second party, and (ii) the transfer of session delivery confirmation from the second to the first party. In the absence of a trusted third party, the two parts of such exchange transactions are processed at different times due to varying processing times, time zone differences, or other factors. Until both parts of the transaction are completed, a party that has completed its part of the transaction but not yet received confirmation from the other party is subject to risk, because the other party may default on its obligation. This risk is known as "Herstatt" risk.

To mitigate the Herstatt risk, transactions may be settled by a trusted third party (e.g., an escrow agent). The trusted third party accepts sessions on behalf of its customer (e.g., Business Process Outsourcers, SaaS and PaaS solutions, IBM, Accenture, Amazon), manages the session of one party until the other party has also provided its confirmation, and then processes all parts of the transaction together. The trusted third party thus ensures that a transaction is either processed in its entirety or not at all. Further, the trusted third party can guarantee that credits are reserved for a specific transaction and cannot be used in unrelated transactions. This "all-or-nothing" approach of processing a transaction is known as "atomic settlement" "session-vs-confirmation."

The use of a trusted third party does not necessarily establish a predetermined order in which transactions settle over the course of a given business day. In the communications market, sessions scheduled for a specific day may settle at any time during the course of that day. To account for delays in settlements, parties often maintain node access for extended periods to ensure that, regardless of the order in which sessions are processed, the node will be available when the session has been processed. The need to compensate for a worst-case scenario can thus require that large number of sessions be set aside to meet this so-called intraday delivery requirement. The resulting technical problem is inefficient allocation and reservation of communication nodes while awaiting transaction settlement.

Intraday deliverability requirements can be reduced by processing sessions more rapidly, preferably such that previously initiated transactions settle before new transactions are initiated. In conventional disparate communications systems this is difficult to realize because session transactions need to process through multiple private ledgers prior to settlement and thus incur delay. Cryptographic currencies, such as Bitcoin or Ripple have offered an alternative mechanism based on a single ledger for all participants. Such systems and methods are able to process transactions in order and are fast compared to conventional systems, in part due to the use of a secure, often de-centralized public ledger as opposed to multiple private ledgers. Such systems and methods suffer from significant disadvantages, however, in terms of privacy. Privacy is difficult to maintain in such systems and methods because transparency is important to ensure trust and the integrity of the ledger. Accordingly such ledgers maintain balances and transaction records in publicly accessible ledgers that are stored on distributed servers. This transparency helps maintain the accuracy of records by allowing many parties to observe and approve changes applied to a distributed public ledger. While this public availability promotes liquidity and trust, such systems teach away from, and are contrary to the desire of wholesale market participants who must support privacy through controlled visibility, but still allow identification of specific users for regulatory and fraud-prevention reasons. The telecommunications market is one example.

Another method of increasing liquidity involves the use of market makers. Where transactions are fully visible, other parties can change their behavior before the market makers have hedged the risk associated with the transaction. In practice this means the market will move against the market maker as soon as the transaction is published. Because both the customer and the market maker know this, an expected additional cost is passed from the market-maker to the customer. For this reason neither buyer nor seller in a large transaction has an interest in immediate publication. Most regulated securities exchanges, therefore, have rules which allow for delayed publication of at least some trades. The practice of moving against the market maker is known as predatory trading and is discussed in detail in the journal article "Predatory Trading," authored by Markus K. Brunnermeier and Lasse H. Pedersen, published in "The Journal of Finance," vol. LX, No. 4 in August 2005, which is hereby incorporated by reference herein in its entirety.

Systems and methods relying on a cryptographically secure public ledger (e.g., Ripple and Bitcoin) may attempt to increase privacy by obfuscating the identity of a specific party by using arbitrary account numbers that are not easy to attribute to a specific real-world party. Large institutions (e.g., central banks), however, cannot rely on such obfuscation alone because the sheer size and volume of their transactions may reveal their identity to the general marketplace. Such obfuscation also hampers the ability to perform identity checks that aid regulators with preventing fraud and illegal activity such as policing anti-money laundering (AML). Therefore, a second technical problem exists in providing a distributed ledger that both allows for swift settlement and enables fraud detection, and does so without sacrificing privacy.

As such, there is a need for new systems and methods that can process communications sessions using a multi-party ledger that allows communications transactions to be settled swiftly, but without sacrificing the privacy of the parties involved or the ability to have built-in mechanisms for fraud identification.

BRIEF SUMMARY

The disclosed systems and methods are generally directed to a distributed computer system comprising a plurality of servers for maintaining and updating copies of a distributed ledger based on cryptographic authentication techniques, adapted for use in settling communications transactions, and a method of using a distributed computer system to settle communications transactions using a distributed ledger. Embodiments of the disclosed system and method authorize an individual desiring to enter into a communications transaction and associate the individual with a loaded node (for example, a fixed or mobile communications device). A distributed ledger is maintained with a smart contracts repository and associates with such individual or node. A communications transaction is then settled (in a single session or by exchanges of two or more transactions) between two or more authorized parties or authorized endpoints by executing the smart contract on the distributed ledger. Because of the centralized distributed ledger and automatic execution of the smart contracts, the session is settled rapidly. Cryptographic techniques allow transactions to be settled in a private and secure form to prevent third parties from observing the session (or adjusting the ledger detail) before or during the session process.

BRIEF DESCRIPTION OF THE DRAWINGS

For purpose of explanation, several embodiments are set forth in the following figures.

DESCRIPTION OF DETAILED EMBODIMENTS

Figure 1:
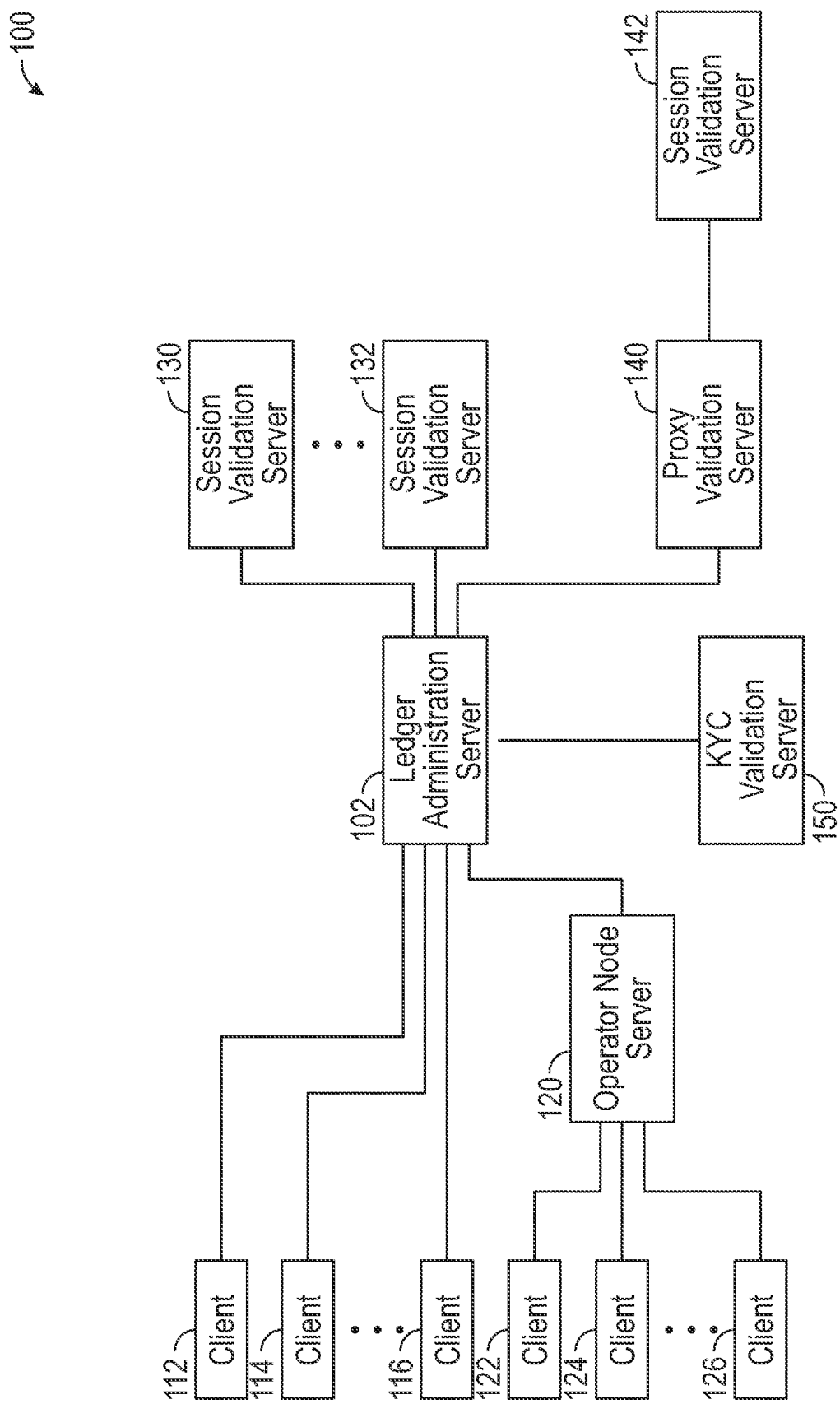
FIG. 1 is a block diagram of an embodiment of a distributed computer system that maintains and updates a distributed ledger for use in settling telecommunications transactions.

In the following description, numerous details are set forth for purpose of explanation. However, one of ordinary skill in the art will realize that the embodiments described herein may be practiced without the use of these specific details. In other instances, certain structures and devices are shown in block diagram form to not obscure the description with unnecessary detail.

Herein, "adapted" means configured, programmed or networked as appropriate to render an item suitable for use with another apparatus or method. "Adapted" is intended herein as a description of structure, and not as a description of function.

As used herein, "node" refers to a device capable of communicating in a communications transaction. Examples of nodes include, without limitation, personal computers, laptops, tablets, smartphones, internet-of-things (IOT) devices, pbx (private branch exchange), or other software or service which supports single or multi-channel communications for personal or business use.

"Communications transactions" as used herein may include text/SMS messages, voice communications, video communications, e-mail communications, push communications, or any other transaction in which a connection between two nodes is established (in real time or in a store and forward setting) and data is transmitted between them.

The term "session" herein means a communication between two nodes that has a start time and end time.

The terms "credit" or "asset" refer to a representation of a thing of value such as a cryptocurrency, a fiat currency, a credit amount, an arbitrary reward program "point" or similar abstraction. "Credits" or "assets" are sold, given or transferred to a party as a moniker of value. For example, and without limitation, a user may be given "credit" for a certain value in fiat currency or cryptocurrency that can be exchanged for communication sessions of a given duration or type. Alternatively, a user may provide access to a node (such as mobile computing device) for advertising displays, each such display having a predefined point or asset value. "Credit" or "asset" herein refers not to the thing of value itself, but to a representation of that thing of value on a ledger or other record.

The term "smart contract" as used herein refers to an executable set of rules for either transferring credits from one node or user to another, or authorizing communication sessions between one node or user and another when a predefined set of conditions are met. Smart contracts typically exist as programmatic rules on a distributed ledger that are executed automatically by the servers maintaining such ledger when the predefined conditions are met.

The term "ledger" as used herein refers to a list of records stored on one or more computer servers using cryptographic means to prevent unauthorized changes.

The term "identity information" as used herein means data capable of associating a node, session, smart contract, or asset with an individual and/or group of individuals.

The term "settlement" or "settle" as used herein refers to the connection of a communications session between two or more nodes and is often, but not necessarily, coincident with the completion of a smart contract on a distributed ledger. It will be understood that settlement may occur at the commencement of a communications session (where duration is not significant) or at completion of a communications session (where duration impacts value).

The meaning of other terms may be defined herein, or will otherwise be apparent to those of ordinary skill as the ordinary meanings used in the art of software systems and telecommunications.

Embodiments of the systems and methods described herein include at least one ledger administration server, and typically a plurality of said servers, that control a distributed ledger to allow a communication session transaction to settle rapidly. In embodiments of the systems and methods described herein the plurality of ledger administrative servers typically operate to create a consensus in the distributed ledger according to methods and systems known in the art (i.e. blockchain distributed ledgers). The following art relating to known blockchain consensus systems and methodology (and related technologies) is hereby incorporated by reference: Satoshi Nakamoto, Bitcoin: A Peer-to-Peer Electronic Cash System, 2008; Vitalik Buterin, A Next Generation Smart Contract & Decentralized Application Platform, Blockstream Team, Enabling Blockchain Innovations with Pegged Sidechains, and Gavin Wood, Ethereum: A Secure Decentralized Generalized Transaction Ledger.

As described in the art, a block chain or blockchain is a distributed database that can maintain a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin (e.g. Satoshi Nakamoto 2008 whitepaper described herein). The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the block chain that creates a transaction can determine within a level of certainty whether the transaction can take place and become final by confirming that no conflicting transactions (i.e., the same currency unit has not already been spent) confirmed by the block chain elsewhere.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, (e.g., when someone sends cryptocurrency to another person), and blocks are created by users known as "miners" who use specialized software/equipment to create blocks. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, meets other criteria. In some block chain systems, miners are incentivized to create blocks by a rewards structure that offers a pre-defined per-block reward and/or payments offered within the transactions validated themselves. Thus, when a miner successfully validates a transaction on the block chain, the miner may receive rewards and/or payments as an incentive to continue creating new blocks.

In certain embodiments of the present invention, settlement may occur in real-time or substantially real-time, thereby reducing inefficiencies caused by maintaining nodes in an open state while awaiting settlement. An embodiment of the system creates data tables that record verified accountholders and a unique identifier of each node held by that respective accountholder. The system further records communication session issuing authorities. Each communication session issuing authority is an authority (or a proxy for that authority) that controls the supply of a particular session held by one or more of the accountholders. The system includes a validation process that provides each session issuing authority with view/approval access to the node(s) of each accountholder, but restricts that access to a portion of the node that records approved sessions to the node(s) issued by that issuing authority.

The system embodiment stores redundant copies of the data tables, which include account information (e.g., credits) and associated smart contracts, at the ledger administration server(s) and at session validation servers associated with the session issuing authorities. The distributed storage of the data tables provides additional protection from attempts to falsify information stored in the data tables of the distributed ledger because more than one server would need to be compromised for the ledger to be falsified or corrupted. The system embodiment uses authentication techniques to verify identifying information and perform know-your-customer (KYC) or anti-money laundering (AML) checks for appropriate session transactions. As one example, cryptographic codes can authenticate electronic signatures appended to data messages by comparing the electronic signatures to hashes obtained from processing the data messages with a public key of the signing party. In this way, a message from an account holder can be reliably distinguished from a false message, and an account holder can be identified.

Accountholders may submit sessions to the system through client nodes, such as personal computers, laptops, smartphones, tablets, wearable communication device, or other suitable types of devices. Responsive to user input, the client nodes may generate data messages that include transaction confirmations to be transferred, e.g., from a first to a second party. The transaction may involve a single session or multiple sessions, as is the case within multi-channel communications transactions.

Client nodes may send data messages directly to the ledger administration server that controls the processing of the communication session transaction. Client nodes may also send the data messages to other servers, such as servers maintained by a third party representing the participants of the smart contract, and these servers may in turn relay the messages to a ledger administration server as part of executing the smart contract. The data messages may include electronic signatures appended by the client nodes (e.g., using a private key). These electronic signatures may be processed by the ledger administration server to verify that the data messages were sent from the client node and authorized by the respective accountholder (e.g., using a public key). According to an embodiment of the invention, a ledger administration server employs a processor which can perform various functions, including verifying electronic signatures, identifying the nodes associated with the transaction, checking smart contract details, and performing KYC validation. For example, the data message of an e-mail transaction, in which a first party authorizes a session from a second party in exchange for credits, may include transaction amounts in "credits" and "coins," respectively. In such a circumstance, a smart contract—executed by the ledger administrative server—would allow one party (e.g., an advertiser) to send an e-mail to second party (e.g., a potential consumer of goods provided by the advertiser) in exchange for transferring credits to the second party (e.g., compensating the consumer for receiving the advertisement or accepting the message).

In addition to determining the session value associated with the transaction, the ledger administration server can further employ a processor to identify a set of session validation servers that validate the communication session transaction. For example, each of the session validation servers can be associated with the issuing authority of a specific session involved in the transaction. Following the identification of the set of session validation servers, the ledger administration server creates data messages based on the transaction data and sends it to each of the session validation servers. As part of creating the data messages, the ledger administration server can append electronic signatures that can be used by each of the session validation servers to verify that the data message has been sent by the ledger administration server and is not counterfeit.

A session validation server associated with a given asset creates and stores redundant records of included smart contract terms in the distributed ledger for that given session. The redundant records may be employed by the session validation server to verify the details of an accountholder independently from the ledger administration server. following the receipt of a data message corresponding to a transaction from the ledger administration server, the session validation server can employ a processor to compare account details stored in its records with the communication session details provided in the data message. If the session contract term has expired (i.e., if the term was for 6 months and the time elapsed in 12 months), the session validation server may refuse to continue the processing of the transaction. Alternatively, the session validation server may transmit a data message to the ledger administration server to indicate that the communication session should be rejected. The session validation server may append an electronic signature to the data message that can be used by the ledger administration server to verify the authenticity of the message with respect to the session.

If the session validation server determines that the term of the smart contract is less than or equal to the timeframe assigned by the accountholders and all other conditions required by the smart contract are met, the session validation server modifies the executed terms stored at the session validation server to reflect a balance equal to the communication session amount while the session continues to be processed. For example, the session validation server may employ a separate data structure to update a reserve on executed terms associated with current or pending sessions. By reserving a portion of the available terms to obtain a "pending contract," the session validation server may reduce the likelihood of "double spending" or "replay." Such double spending or replay may occur in systems that process transactions faster than updating the available terms. In such systems, fraudulent transactions that individually meet available terms, but cumulatively exceed the available terms, may be approved, because the system may not update the available terms between sessions. Session validation servers are a solution to this potential problem because they eliminate such double spending by maintaining a pending contract while sessions continue to be processed.

The ledger administration server may also perform KYC checks in accordance with regulatory requirements. The ledger administration server may compile and store indications of such KYC authorizations in a look-up table, e.g., upon receiving such indication in a signed message from a KYC validator such as a third party authority. In some aspects, KYC authorizations may be based on a chain of trust. For example, the ledger administration server may determine to accept a KYC authorization if the corresponding KYC validator indicates that it trusts the client and the ledger administration server (or session validator associated with the session involved in the transaction) in turn trusts the KYC validator. If the ledger administration server determines that any of the parties of a communication session are not associated with a valid KYC authorization, the ledger administration server can reject the session and provide a corresponding signed message to parties involved in the session.

For transactions that involve more than one communication session or node, the ledger administration server receives a separate data message from the session validation server of each session involved in the transaction. Following the receipt of such messages, the ledger administration server can determine if one or more of the data messages includes an indication that the communication session should be rejected (e.g., due to expired terms or insufficient balance). If at least one of the data messages includes such a rejection, the ledger administration server rejects the communication session in its entirety and does not update the ledger terms balances of any parties involved in the session. Conversely, if all of the data messages received from the session validation servers include indications that the communication session should be approved, the ledger administration server updates the communication session balance maintained in its copy of the encrypted ledger.

To synchronize distributed ledger copies, the ledger administration server sends portions of the updated ledger to the session validation servers in the form of data messages. The data message sent to a specific session validation server may only include terms for accounts held in the session maintained by the specific session validation server. For example, a validation server for Facebook messenger or Skype may only be sent the portion of the updated ledger that corresponds to communication sessions for those specific platforms. These data messages may also include a list of completed sessions that have been incorporated into the updated distributed ledger together with their respective unique identifiers and communication session data. After receiving such data messages, a session validation server may update its records based on the list of completed sessions, by modifying the communication session balances and records of reserved and pending sessions. For example, a session validation server may remove the session amount of a completed transaction from the pending balance because that completed transaction is now reflected in the term balances included in the updated ledger. The session validation server may further update status indications corresponding to transactions included in the list of transactions to denote that they have been completed and are no longer pending. The periodic transmission of communication session balances from a ledger administration server to a session validation servers helps ensure that the distributed and redundant copies of the encrypted ledger, which are maintained separately at ledger administration servers and session validation servers, remain consistent.

The systems and methods described herein address the problem of the significant time delay that arises in the current communication session transaction processes by providing a system architecture and methodology that can operate more rapidly through the use of a distributed ledger in processing communication session transactions. In certain embodiments of the invention, communication session transactions can be settled efficiently and substantially in real-time. The systems and methods further address the problem of lack of identity verification of parties participating in current exchange processes by making identity checks that can satisfy KYC standards a component of the exchange process, but doing so in a manner that need not compromise privacy. The systems and methods further address the problem of publically disclosing information about communication session balances or transactions to third parties that do not need to know or otherwise access that information and thereby can reduce the risk/cost of making such transactions compared to the current transaction processes.

In accordance with other embodiments of the present disclosure, systems and methods are provided for modifying a set of data tables having a plurality of accounts rapidly, and in some embodiments, substantially in real-time. The systems and methods comprise receiving a request to modify an account selected from the plurality of accounts, wherein the selected account comprises at least one fixed or mobile node, and determine an identity of a validator based on the received request and the at least one session, wherein the validator is configured to validate the request more rapidly than is common where separate private ledgers are used. The systems and methods may further modify the data table in substantially real-time (if the validator validates the request). In some embodiments, the validator may use an internet-of-things device, or multiple devices. Particularly, in some embodiments the validator could comprise biometric recognition or the like, for example, using Alexa, Google, or Siri biometric recognition (i.e. voice print, facial) or combinations thereof.

In some implementations, the validator may be a first validator and the at least one node may participate in a first and a second session. The systems and methods may further include determining an identity of a second validator based on the received request, wherein the second validator validates the request in substantially real-time for the second session.

In some implementations of the invention, the data table is modified to process a session confirmation, transfer, or trade transaction where at least one session corresponds to a fixed or mobile node, and the validator is an issuing-authority of the fixed or mobile node. In some aspects, the issuing authority of the fixed or mobile node is a proxy for an organization that issues the node or a node holder that issues the node. In some implementations, the data table is modified to process a credit transaction, and the first session corresponds to a first credit and the second session corresponds to a second credit. Further, the first validator corresponds to a first issuing authority of the first credit, and the second validator corresponds to a second issuing authority of the second credit. In other implementations, the received request comprises modifications to several accounts in the plurality of accounts in the data table, the validator is a first validator of a plurality of validators, and each of the plurality of validators is associated with a different node. Further, the systems and methods of certain embodiments of the invention can include determining a plurality of identities for the plurality of validators based on the received request, wherein each of the plurality of validators validates the request in substantially real time.

In some implementations of the invention, the systems and methods may encrypt the plurality of communication sessions in the data table differently, so that a decryption process used by the first validator to access data of the first session cannot be used to access data of the second session.

In some implementations, the validator may determine whether to validate the request based on retrieving a published session from the data table for the account and the at least one node, and computing a term remaining balance by reducing the published balance by pending balances associated with pending and reserved confirmations. The systems and methods may further approve the request when the available term balance is greater than or equal to a transaction amount of the request and reject the request when the available term balance is less than the session amount of the request. In some implementations, the validator stores the pending balances associated with pending and reserved confirmations and a redundant copy of the data table.

In some implementations, the validator determines whether to validate the request based on verifying whether a party associated with the node is authorized to perform the request.

In some implementations, the validator stores a redundant copy of the data table and the systems and methods further comprise sending modified portions of the data table to the validator, in response to modifying the data table. In some implementations, the redundant copy of the data table is encrypted to prevent the validator from accessing data that is of a session different from the at least one session.

Certain illustrative embodiments of the system and method of the present disclosure are now described in connection with the figures. FIG. 1 is an illustrative block diagram of an embodiment of a distributed computer system 100 that maintains and updates a distributed ledger suitable for settling communications session transactions. Computer system 100 includes ledger administration server 102, operator node server 120, session validation servers 130, 132 and 142, proxy validation server 140, as well as KYC validation server 150. Ledger administration server 102 is a computing device capable of updating a ledger and communicating with other computing devices over a digital network that may be either a private network (such as a TCP/IP local or virtual private network) or a wide area network such as the internet. Ledger administration server 102 may be a specially programmed physical server, a virtual machine, or a special purpose computing device (such as an ASIC) adapted to rapidly process communication session transactions. Ledger administration server 102 communicates with nodes 112-116 and 122-126 via a digital network. Communication may be direct (e.g., to nodes 112-116) or indirect through operator node server 120 (e.g., to nodes 122-126). Operator node server 120 may be a computing device capable of communicating on the same digital network as ledger administration server 102, and may be a specially programmed standalone server, a specially programmed virtual server in a cloud computing environment, or a special purpose computing device. Nodes 112-116 and 122-126 may be fixed or mobile devices. There may be any number of directly connected nodes or indirectly connected nodes. Herein nodes 112-116 and 122-126 may also be referred to as "clients" with the understanding that each is intended to represent a "node" as such term is used herein.

Clients 112-116 (generally client 112) and clients 122-126 (generally, client 122) may be employed by smart contract stakeholders to access, create, or modify terms stored in the distributed ledger. Client 112 may include a processor and storage circuitry that stores software (e.g. applications) or other instructions that enable client 112 to exchange information (e.g., in the form of encrypted or unencrypted data messages) with operator node server 120 or ledger administration server 102. In one example, coupling client 122 to ledger administration server 102 through operator node server 120 may improve the scalability of system 100, because operator node server 120 acts as a proxy such that ledger administration server 102 can effectively service multiple clients by communicating with operator node server 120 instead of communicating directly with clients 122-126.

In one possible embodiment, client 122 may store smart contract term balances for an accountholder associated with client 122. Alternatively or additionally, client 122 may also cause operator node server 120 to store the smart contract term balances for a single account holder associated with one or more clients. In such an embodiment, client 122 may store account information exclusively on operator node server 120 because client 122 may be vulnerable to theft (e.g., if client 122 is a mobile device) or may have a higher chance of being accessed illegally (e.g., through hacking) or tampered with (e.g., by infection with a software virus) because of how it is connected, configured or used.

Operator node server 120 may include physical or virtualized processors and storage circuitry to store the account information per accountholder and associate the smart contract term balance held in the distributed ledger with a conventional telecommunications account (e.g., fixed or mobile accounts) maintained by the accountholder. In one embodiment, for example, operator node server 120 may be one or more telecommunications company servers adapted to maintain a portion of a distributed ledger for clients authorized or operated by that telecommunications company and used by that telecommunications company's account holders.

Ledger administration server 102 stores a copy of the distributed ledger comprising records of communication session transactions for a plurality of clients and operator node servers. In the illustrated embodiment, the ledger includes smart contract balances for all accountholders in system 100, including both the accountholders directly authorized by ledger administration server 102 (the users of nodes 112-116) and accountholders authorized by operator node server 120 (the users of nodes 122-126). The account of each accountholder may include smart contract balances in multiple sessions. Ledger administration server 102 may employ a processor (physical or virtualized) to process transactions received, for example, in the form of data messages received directly from client 112 or indirectly from client 122 (e.g., through operator node server 120). A transaction may involve a single session or multiple sessions (for example: in case of a multi-session transaction, there will be two or more unique or combined sessions which are both sessions).

In the illustrated embodiment, ledger administration server 102 is coupled (meaning that it is adapted to communicate through a digital network) to session validation servers 130-132 (generally, session validation server 130). The processing of a communications transaction by ledger administration server 102 may include the exchange of data messages between ledger administration server 102 and session validation server 130.

Session validation server 130 can be any computing device capable of validating a communication session transaction, as described herein (including a specially programmed standalone server, a specially programmed virtualized server, or a special purpose computing device) and includes a processor and storage circuitry configured to store redundant whole or partial copies of the distributed ledger. The storage of the redundant copies may improve the robustness, reliability, and security of the ledger because in order to falsify or otherwise alter session balances stored by the encrypted distributed ledger, several of the redundant copies would need to be modified. As ledger administration server 102 and session validation server 130 operate independently of one another, the task of compromising both servers is made more difficult.

In an embodiment in which distributed ledgers are used, it may be desirable to control visibility of ledger entries to avoid use session balances from being made visible to the general marketplace. Cryptographic techniques can thus be used to enable the entire ledger to be distributed, while still controlling visibility.

In the illustrated embodiment, ledger administration server 102 and session validation server 130 may control visibility into the ledger by requiring a username and password, two-factor authentication, or other suitable forms of access control to obtain read or write access to the stored copy of the distributed ledger. Further, while ledger administration server 102 may have full access to the distributed ledger, session validation server 130 may only be granted access to those portions of the ledger that include account session balances of the specific node that is validated by session validation server 130. In a simple embodiment, this may be accomplished via a shared directory or authentication service. Alternatively, a public-key, private-key infrastructure may be used.

As an example, each of the session validation servers 130 and 132 would validate a communication session using credits administered by smart contracts where different types of messages would correspond to different credit values, which may be credited or debited according to predetermined rules. For example, a rule might establish that in order to establish an e-mail session with a given accountholder; the accountholder or a third party would need to receive a credit. With such a rule, the accountholder initiating the communications transaction would be debited a credit and the accountholder receiving the message, or a third party, would receive a credit. A separate rule may establish that a messaging session would receive 2 credits. In certain embodiments where disparate parties participate in communications sessions, credits may be crypto-credits such as special purpose or general purpose digital tokens. Transfer of credits is accomplished by a smart contract, based on the session type and operated by the issuing authority of that node (e.g., the fixed or mobile operator of communications like Verizon, ATT, Twilio). In such a scenario, session validation server 130 may ensure that each session stored in the ledger of system 100 is backed by a "real-life" unit of sessions held, confirmed or controlled by a corresponding session validation server 130. Session validation server 130 may validate a transaction without notifying ledger administration server 102 of the identity of the customer, or doing so in an encrypted form for which session validation server 130 has a key but ledger administration server 102 does not. In this way, the ledger may maintain customer confidence by being transparent to regulators that oversee the supply of a given asset without revealing confidential transactional information to the general marketplace.

In certain embodiments, it is possible that not all session issuing authorities choose to provide session validation servers that exchange data messages with ledger administration server 102 in substantially real-time. For such sessions, a proxy may validate sessions by means of a proxy validation server 140. Proxy validation server 140 may be similar to session validation servers 130 and 132; however, because proxy validation server 140 is not controlled by a session issuing authority, proxy validation server 140 may not be able to ensure directly that each unit of session stored in the ledger of system 100 is backed by a "real-life" session. To increase client confidence, proxy validation server 140 may further be connected to session validation server 142, which is controlled by the respective session-issuing authority. While session validation server 142 may not store or control the distributed ledger, session validation server 142 may be configured to verify that the combined ledger balances maintained by proxy validation server 140 are backed by corresponding "real-life" available sessions inclusive of the pending sessions remaining in the smart contract. In this way, the session-issuing authority may utilize a private ledger, using proxy validation server 140 to replicate private ledger transactions on the public ledger, either as a service or for decoupling reasons. Session validation server 142 may control the amount of sessions held in the available sessions cue in real-time and may thus continuously update the remaining session balance in the pending account based on supply and demand for the sessions. Proxy validation server 140 may be configured to associate the available sessions and cue the pending as resources allow. These are copied in the ledger in real-time, such that the combined operation of proxy validation server 140 and session validation server 142, although decoupled, provide a one-to-one correspondence of balances in the public ledger with "real-life" units of the respective session recorded in a private ledger.

Ledger administration server 102 may further be coupled to KYC validation server 150. KYC validation server 150 may create and store electronic records that contain KYC information, such as tax identification numbers, Personal Identification Numbers (PINs), fixed or mobile account numbers, telephone numbers, or any other suitable form of personal identification. Ledger administration server 102 may access the KYC information stored by KYC validation server 150 by exchanging data messages. For example, ledger administration server 102 may send a message that includes indications of the parties of a session to KYC validation server 150 along with information that verifies the authenticity of the data messages (e.g., an electronic signature of ledger administration server 102). Responsive to receipt of the message, KYC validation server 150 may access customer records based on the account information included in the data message and may retrieve a KYC status. KYC validation server 150 may be a specially programmed physical or virtualized server, or a special purpose computing device that employs a processor to prepare a data message in response to the request received from ledger administration server 102 and may send it along with its electronic signature to ledger administration server 102. Although not illustrated, session validation server 130 may also be coupled to KYC validation server 150, in which case session validation server 130 may be relieved of the KYC regulatory tasks. It is understood that ledger administration server 102 and session validation server 130 need not access KYC information in real-time or for each transaction. For example, ledger administration server 102 may store KYC information obtained for client 112 and use that information to perform multiple KYC checks over time. Accordingly, the aforementioned data messages that are exchanged between KYC validation server 150 and ledger administration server 102 are not necessary for every session, which helps reduce the time needed to process a session.

As illustrated, embodiments of system 100 thus provide a solution to the problem of enabling disparate clients and session authentication authorities to rapidly settle communication session, transactions using a public ledger that still allow for visibility control and regulatory validation. In addition, since credits may be credited or debited through smart contracts executing on or reflected in the public ledger, rules can be established for session transactions that do not require consensus among parties. Instead, the smart contract specifies the conditions for the transaction. When the conditions are met, the session transaction is settled automatically. There is no need for session authentication authorities to agree beforehand on the value of session communications transactions.

Figure 2:
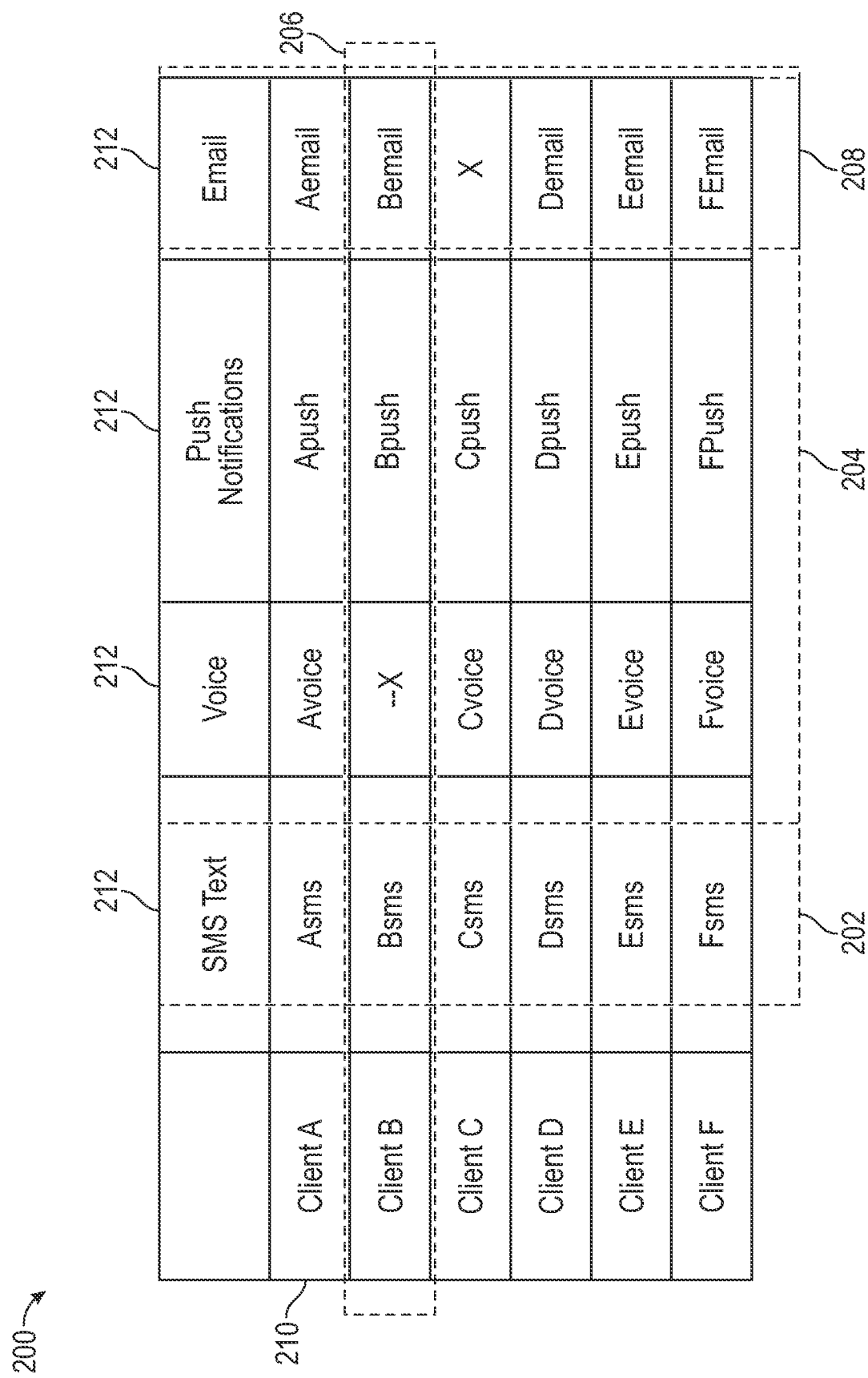
FIG. 2 is a block diagram of an embodiment of a distributed ledger with visibility restrictions suitable for use with embodiments of systems and methods according to the present disclosure.

FIG. 2 shows a block diagram of a distributed ledger 200, which can suitable for use with embodiments of system 100. For illustration, ledger 200 is shown as a table including rows 210 that contain ledger nodes per client, and columns 212 that correspond to different session types. For each client, ledger 200 contains at least one ledger session balance per session type. For example, a smart contract stakeholder associated with rewarding client A for access to a session balance of 100 SMS text messages, 100 voice calls, 100 push notifications, and 100 e-mails. These are to be scheduled for immediate or future delivery, under the specific terms of a smart contract. Some clients may only maintain a session balance for a subset of the available session types. Records stored in ledger 200 may include an indication that specific session types or channels are not used. For example, client B has a ledger session balance for 100 text messages but no session balance for voice. A reserved value may be stored in session ledger 200 instead of associating a zero balance to indicate that client B generally does not utilize a session channel type that requires given session type. In some aspects, another reserved value may be used to indicate that a client is not permitted to perform transactions for a certain session type (e.g., due to regulatory or AML regulations). For example, client C may not be permitted to perform ledger transactions that involve an unsupported session channel type, which is denoted by an "X" in the corresponding entry of the ledger. Another example is client F is a series A broker and not allowed by regulation to use SMS Text, which is denoted by an "X" in the corresponding entry of the ledger.

As discussed in relation to FIG. 1, system 100 provides swift processing of transactions that may be validated by regulators but opaque to the marketplace. The organization of ledger 200 shown in the illustrated embodiment, illustrates the visibility restrictions that are enforced by the illustrated embodiment of system 100. For example, while ledger administration server 102 may have access to ledger 200 in its entirety, session validation server 130 may have restricted access to ledger session balances that pertain to the specific session validated by that server. For example, a session validator for SMS Text messages (e.g., session validation server 130) may only have access to SMS ledger portion 202, together with the associated client identifiers. Similarly, a session validator for Facebook messenger, push notifications (e.g., session validation server 132) may only have access to combined ledger portion 204 together with the associated client identifiers.

In certain embodiments, a client or node may also maintain a portion of ledger 200. For example, a client corresponding to a specific accountholder B may have access to all ledger session balances associated with said client (client-specific ledger portion 206), which includes ledger session balances for all session types for that client.

In certain embodiments, different clients may have smart contracts in place that are specific to those clients. For example, client A may initiate a smart contract with client D, such as a family and friends limited or perpetual smart contract. In this way, client A authorizes client D to send client A different types of messages in exchange for community building credits. This transaction involves two nodes under smart contract agreements; client A and client D execute a perpetual personal smart contract (not illustrated) which is stored in ledger administration server 102. Ledger administration server 102 may receive separate data messages from clients A and D that request the session(s) and may control the processing of the sessions as required by that smart contract. As such, ledger administration server 102 may have complete access to the ledger session balances and smart contract types of clients A and D and can settle session transactions between them by executing the smart contract to add and remove credits from their respective accounts as set forth in the smart contract.

While ledger administration server 102 may have access to the entirety or a substantial portion of ledger 200, session validation servers 130 and 132 may only have access to portions of ledger 200. For example, session validation server 130 may validate the SMS Text message portion of a session and may therefore access SMS ledger portion 202 (which includes the ledger smart contract type and terms for SMS sessions), but not combined ledger portion 202 (which includes non-SMS session balances). Similarly, session validation server 132 may validate the Push Notification portion of the transaction and may therefore access that part of combined ledger portion 204 that include the ledger session balances for Push Notifications but not other portions that are unrelated to push transactions. The smart contracts (not illustrated) may conveniently identify the validators with access to the portion of ledger 200 that requires validation or updating to finalize a session transaction.

Figure 3:
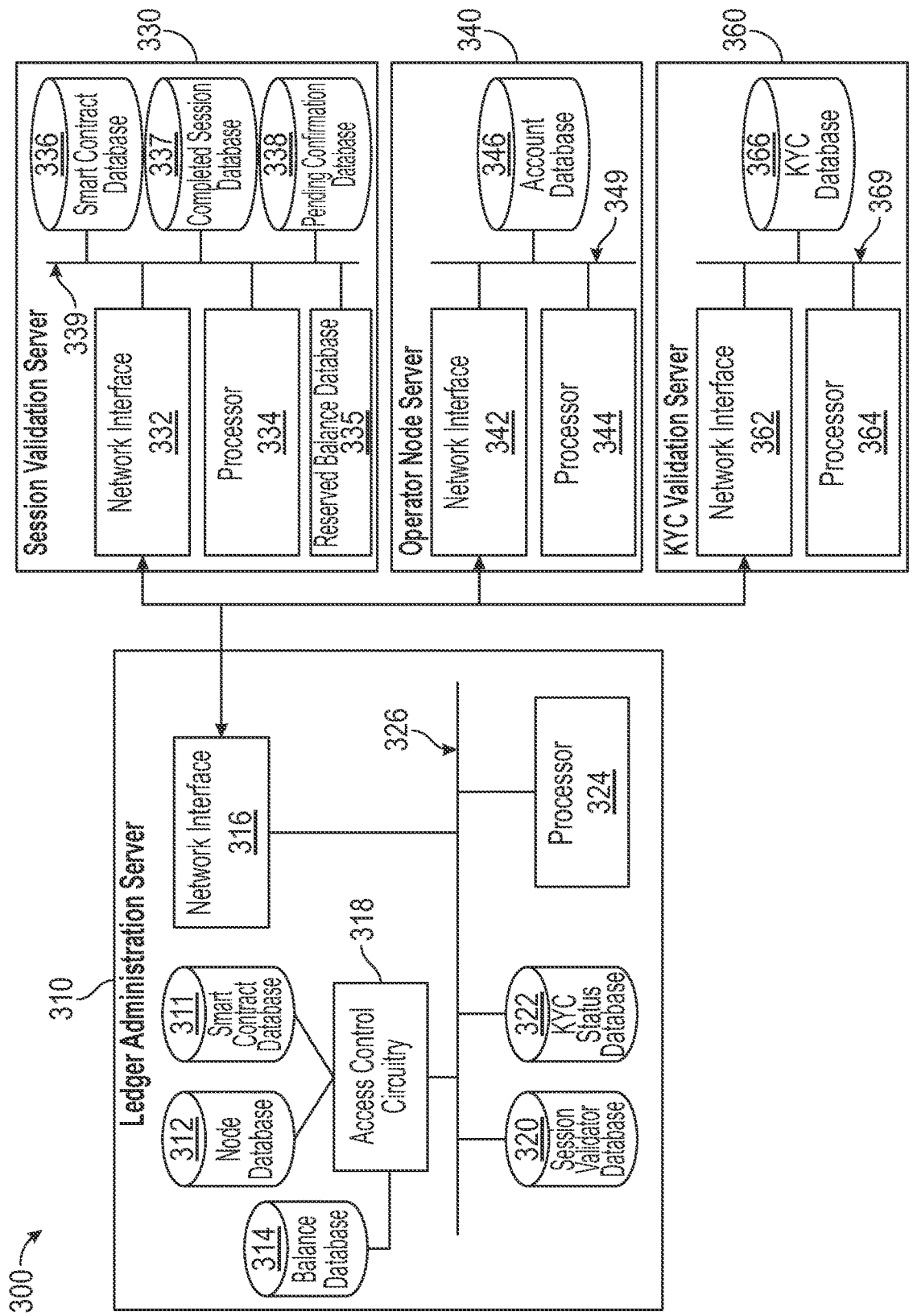
FIG. 3 is a block diagram of an embodiment of a ledger administration network suitable for use with certain embodiments of systems and methods according to the present disclosure.

FIG. 3 is a block diagram of an embodiment of a ledger administration network 300, which, with embodiments of systems and methods according to the present disclosure, can be suitable for maintaining ledger 200. Ledger administration network 300 includes ledger administration server 310 (which is comparable to ledger administration server embodiment previously discussed in FIG. 1), session validation server 330 (which is comparable to session validation server 130 previously discussed), operator node server 340 (which is comparable to operator node server 120 previously discussed), and KYC validation server 360 (which is comparable to KYC validation server 150 previously discussed). Ledger administration server 310 and session validation server 330 exchange data messages (not illustrated) in order to maintain redundant copies of distributed ledger 200 subject to visibility constraints that allow the transparency required by regulators while making ledger session balances otherwise inaccessible to the general marketplace. Ledger administration server 310 communicates with a client (not illustrated) and controls the processing of a session requested by that client. To do so, ledger administration server 310 exchanges data messages with session validation server 330 to verify the authenticity and accuracy of the requested session. Unless ledger administration server 310 receives a data message from session validation server 330 that approves the session, ledger administration server 310 may not approve the session. In some aspects, this validation by session validation server 330 provides that ledger session balances may have a one-to-one correspondence with nodes controlled by the issuing authority of the session associated with session validation server 330. Similarly, ledger administration server 310 may send a data message to KYC validation server 360 to request validation of the KYC status of parties involved in the session. However, ledger administration network 300 may not require that KYC information be verified for each session. For example, a subset of KYC information may be stored at ledger administration server 310 or session validation server 330 and updated only at predetermined times (e.g., by exchanging data with KYC validation server 360). An update of KYC information may also be requested by ledger administration server 310 or it may be pushed to ledger administration server 310 by KYC validation server 360. Since KYC data is not expected to change for each session, it may not be necessary to have the entire KYC database updated in real time. Where delayed updates of KYC information is tolerable, latency may be reduced by caching subsets of the KYC database on ledger administration server 310 and synchronizing the cache periodically.

As illustrated, ledger administration server 310 includes processor 324 (which may be a physical or virtualized microprocessor or set of microprocessors) and network interface 316 (which may conveniently be a physical or virtualized network interface card), both of which are connected to physical or virtualized bus 326. Network interface 316 may enable the exchange of data messages between ledger administration server 310, session validation server 330, operator node server 340, and KYC validation server 360 over a local digital network or a wide area digital network such as the internet. Network interface 316 may also be used to exchange data messages directly with clients (not illustrated). Where communication across multiple digital networks is needed, or it is necessary to increase network bandwidth, multiple instances of network interface 316 may be used.

Processor 324 may control the processing and data exchange performed by ledger administration server 310. Processor 324 may also include authentication and encryption circuitry to validate signatures associated with data messages quickly so that access constraints that ledger 200 is subject to may be enforced without inconvenient delays. Bus 326 is further coupled to session validator database 320, KYC status database 322, and access control circuitry 318. Access control circuitry 318 can restrict access to smart contract database 311, node database 312, and smart contract balance database 314.

In some aspects, session validator database 320 is coupled to bus 326 directly because ledger administration sever 310 makes accessible information stored in session validator database 320 without access restrictions. In contrast, access control circuitry 318 may control access to information stored in node database 312 and smart contract balance database 314. In some aspects, session validator database 320 stores a list of pointers, network addresses, or other suitable identification of session validation servers (e.g., session validation server 330) per session.

As part of processing a transaction, ledger administration server 310 requests validation from at least one validation server for each node involved in the transaction. However, multiple node validation servers may be provided per session. When multiple node validation servers are available, session validation server 330 may distribute the processing of sessions among the multiple session validation servers. The multiple session validation servers may also store a larger number of redundant copies of the distributed ledger. A larger number of ledger copies may further strengthen the resilience of ledger administration network 300 against malicious actors or fraudulent sessions.

Ledger administration server 310 further includes node database 312 and smart contract balance database 314, which are configured to store a copy of the ledger session balances maintained by ledger administration server 310. In some embodiments, node database 312 may store all nodes held by a given client, together with other identifying information such as conventional fixed or mobile account numbers as well as cryptographic codes (e.g., the client's public key). The ledger session balances held by the client per node may be stored in smart contract balance database 314 (e.g., as exemplified in FIG. 4). In other embodiments, node database 312 and smart contract balance database 314 may be combined and store, per client, both the nodes and the corresponding session balances in a common data structure. Ledger administration server 310 may restrict access to information stored in node database 312 and smart contract balance database 314 by using access control circuitry 318. Access control circuitry 318 may limit the access of a specific client to nodes held by the accountholder associated with the specific client. Access control circuitry 318 may provide these access restrictions by requiring a username and password or two-factor authentication prior to providing access to the database. Ledger administration server 310 may also have full access to node database 312 and smart contract balance database 314. However, access control circuitry 318 may ensure that ledger session balances stored by node database 312 and smart contract balance database 314 are inaccessible to the general marketplace.

Ledger administration server 310 includes KYC status database 322. Ledger administration server may employ processor 324 to store KYC status information (e.g., information identifying whether a client's node is valid or invalid) per client or per node. Ledger administration server 310 may utilize KYC status database 322 to obviate the need for exchanging KYC data with KYC validation server 360 every time a session is processed. Rather, ledger administration server 310 may update KYC status database 322 at predetermined times, by exchanging data messages with KYC validation server 360, but otherwise retrieve KYC status information from KYC status database 322 in substantially real-time as part of processing a session. In some embodiments, session validation server 330 may store KYC status information in a similar way as ledger administration server 310. For example, session validation server 330 may employ processor 334 to store KYC status information per client or per node and may perform KYC status verification prior to approving sessions received from ledger administration server 330. Similar to ledger administration server 310, session validation server 330 may employ the stored KYC status information (rather than exchange data messages with KYC validation server 360 for each transaction) in order to reduce the time it takes to process sessions.

Similar to ledger administration server 310, session validation server 330 includes network interface 332 and processor 334, both of which are connected to bus 339. Bus 339 is further coupled to smart contract database 336, completed session database 337, pending confirmation database 338, and reserved balance database 335. Similar to ledger administration server 310, network interface 332 may be used to exchange data messages with ledger administration server 310 and operator node server 340. In some aspects, network interface 332 may be connected to additional session validation servers (not illustrated). Ledger administration server 310 or session validation server 330 may control the additional session validation servers and distribute the load associated with sessions among the additional session validation servers. The additional session validation servers may further provide additional protection from unauthorized sessions because each of the additional session validation servers may store redundant copies of the distributed ledger (e.g. distributed ledger 200 or only a subset of the ledger 200). Processor 334 may be employed to authenticate data messages received from other servers in ledger administration network 300.

Reserved balance database 335, smart contract database 336, completed session database 337, and pending confirmation database 338 may store a partial copy of ledger 200, which includes ledger session balances for the session validated by session validation server 330. For example, if session validation server 330 validated all sessions in voice and SMS texts, smart contract database 336, completed session database 337, and pending confirmation database 338 would store all ledger session balances in voice and SMS texts. However, in this case, session validation server 330 would not have access to ledger session balances for other session types such as e-mail or push notifications. In some aspects, completed session database 337 may store a copy of the ledger session balances for sessions that have previously been approved by session validation server 330 and for which completion of the session was reported by ledger administration server 310 as part of a ledger update. In addition, pending confirmation database 338 may store session balances that have been approved by session validation server 330 but not yet reported as complete by ledger administration server 310. For each session balance, only confirmed delivered but not pending confirmation sessions may be recorded, and thus balances in pending confirmation database 338 may be non-negative. Similarly, pending confirmation database 337 may store session balances for sessions that have been validated by session validation server 330 and signed by ledger administration server 310 but not yet included in the updated smart contract balance database 314. Reserved balance database 335 may store "reserved" sessions, which are sessions that have not been marked as completed but have been partially signed.

Together, reserved session database 335, completed session database 337, smart contract database 336 and pending confirmation database 338 help prevent "double spending" or "replay." Using the information stored in completed session database 337 and pending confirmation database 338, session validation server 330 may reduce a published ledger session balance maintained in smart contract database 336 by the amounts stored in the reserved balance database 335 and by the amounts stored in pending confirmation database 338 (e.g., the total sum of pending sessions) and by the amounts stored in completed balance database 337 (e.g., the total sum of confirmed and unconfirmed sessions). The resulting session balance is known as "available balance" and nodes for sessions that have been processed by session validation server 330 but not yet reported as "complete" by ledger administration server 310 in an updated ledger copy. As a result, attempts to "double spend" (e.g., by submitting multiple sessions in quick succession) are prevented, because session validation server 330 updates the "available balance" in response to validating each session.

Similar to ledger administration server 310, KYC validation server 360 may include network interface 362 and processor 364, both of which are connected to bus 369. KYC validation server 360 may use network interface 362 to exchange data messages with ledger administration server 310 and session validation server 330. Processor 364 may authenticate data messages received from or sent to other servers in ledger administration network 300. KYC validation server 360 further includes KYC database 366, which may store customer identifications. Information stored in KYC database 366 may be used to ensure compliance with KYC requirements. For example, at predetermined times, ledger administration server 310 may send a data message to KYC validation server 360 to verify a party's KYC status. KYC validation server 360 may store the relevant KYC status in KYC database 366. Responsive to a request from ledger administration server 310, KYC validation server 360 may search KYC database 366 based on a client identifier (e.g., a client's public key) and retrieve the client's current KYC status. KYC validation server 360 may then transmit a data message back to ledger administration server 310. It should be noted that KYC status need not be checked in real-time for every session. Rather, ledger administration server 310 and session validation server 330 may access KYC information at predetermined times and use a locally stored KYC status for processing sessions.

Similar to ledger administration server 310, operator node server 340 may include network interface 342 and processor 344, both of which are connected to bus 349. Operator node server 340 may serve as an account processor for parties that prefer that information about ledger session balances be maintained on operator node server 340 rather than on their associated client (e.g., client 112). In this scenario, operator node server 340 essentially supplies the aforementioned processes in place of the client. Operator node server 340 may store information about the ledger session balances in account database 346. In some embodiments, operator node server 340 and KYC validation server 360 may be combined and implemented in a single server architecture.

In some embodiments, the redundant copies of the distributed ledger stored by ledger administration server 310 and session validation server 330 may be stored in encrypted form. Ledger administration server 310 may control the visibility into the distributed encrypted ledger (e.g., ledger 200) by employing an encryption process that encodes portions of the ledger differently, such that a decryption process that allows access to a first portion of the ledger cannot be used to access a second portion of the ledger. For example, ledger administration server 310 may encrypt session balances corresponding to a first session (e.g., SMS text messages) such that only a decryption process used by a first session validation server (e.g., a server at Somos, the toll free numbering administrator) can decrypt the session balances. At the same time, ledger administration server 310 may encrypt session balances corresponding to a second session (e.g., Voice) such that the decryption process used by the first session validation server (e.g., a server at Somos) cannot decrypt the session balances of the second session but only session balances corresponding to the first session. In some aspects, ledger administration server 310 and session validation server 330 may exchange copies of the distributed encrypted ledger to ensure that the ledger is consistent across servers in ledger administration network 300. Although the session validation servers may only be able to access portions of the distributed encrypted ledger, it can be desirable to exchange copies of the ledger in their entirety, e.g., for record keeping or improved robustness against failure of ledger administration server 310.

Figure 4:
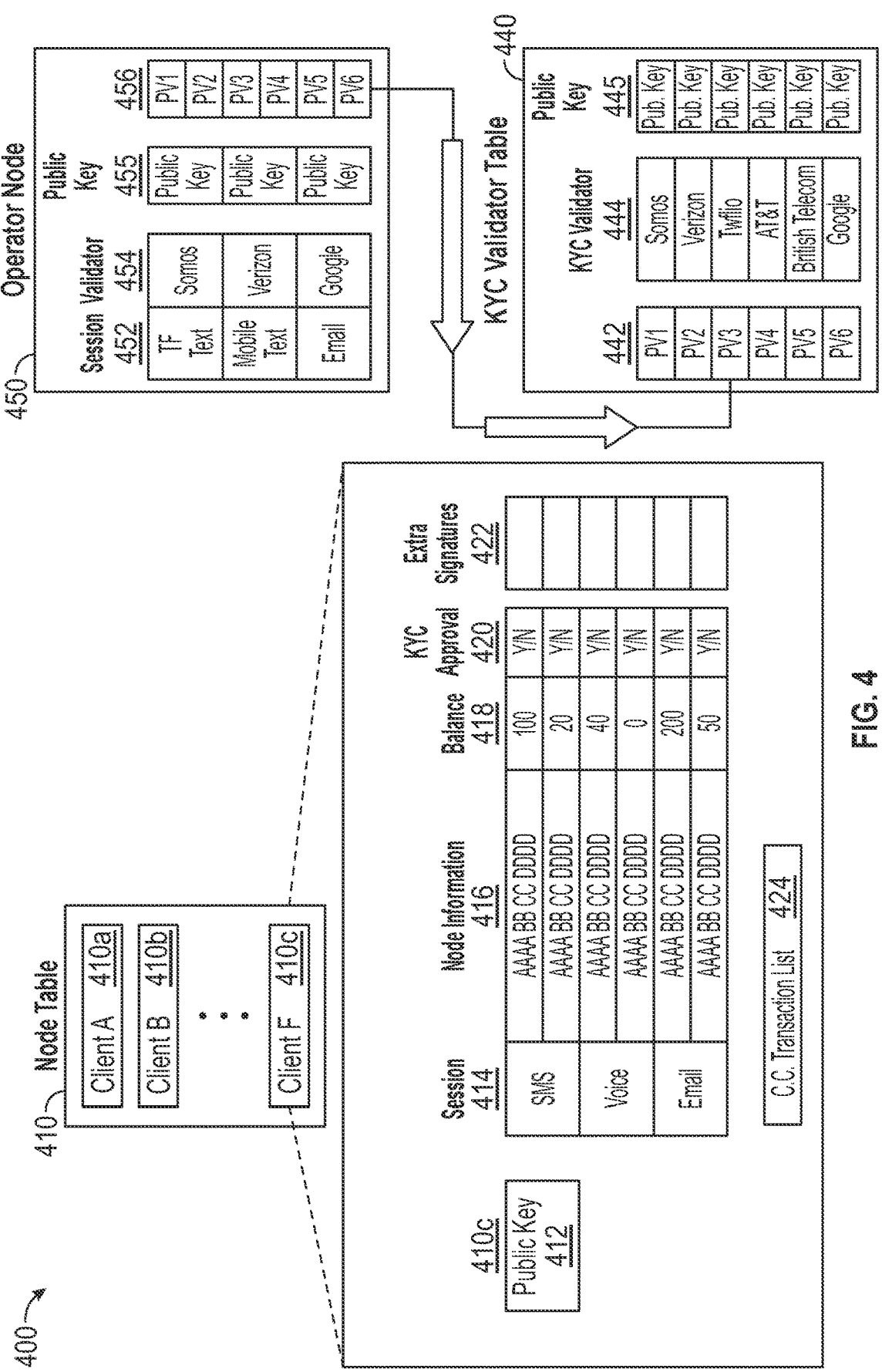
FIG. 4 is a block diagram of an exemplary data structure suitable for storing ledger term balances and node information in an embodiment of a distributed ledger suitable for use in systems and methods according to the present disclosure.

FIG. 4 is a block diagram of an exemplary data structure 400 for storing ledger session balances and node information in the distributed ledger 200. Data structure 400 includes node table 410, KYC validator table 440, and session table 450. Node table 410 includes a list of data blocks, each of which stores ledger session balances 410a-410c associated with a specific session type or channel, such as clients A-F. For each client with an entry in node table 410, a data block of node table 410 (e.g., the data block 410c of client F) may contain a public key 412, session 414, node information 416, smart contract balance 418, KYC approval status 420 and a copy of the cryptographically signed KYC approval message, and an extra signatures field 422 for a list of any additional signatures that may be required to process a session for node information 416. Public key 412, may be used by servers across ledger administration network 300 to verify the authenticity of messages received from a node or server. Session 414 may indicate one or more nodes or other sessions for which the node maintains a ledger balance. Node information 416 may include conventional fixed or mobile account information (e.g., corresponding to a wireless, landline, or other telecommunications account, or a custody account for securities), and several accounts per node may be possible. The node table 410 may include sessions such as SMS Text Messages or voice calls, but also other types of sessions, such as encrypted, e-mail, push notifications, or any other suitable form of session. Data block 410c may store ledger session balances 418 associated with each node information 416. In some aspects, a separate session balance table may be maintained in the ledger and may not be incorporated into data block 410c. In some embodiments, maintaining a session balance table separately from data block 410c may be beneficial because it provides more granular access restrictions, such as a higher level of privacy for the session balance table compared to data block 410c. Data block 410c may further include per-node KYC approval 420, which includes an indication of whether node information 416 has been verified as KYC compliant by one of the approved KYC validators 444 listed in and also the ID of the validator for reference KYC validator table 440. For example, for a specific client associated with data block 410c, "Somos" may be the KYC validator for one of the sessions in SMS Toll Free Text Message; "Verizon" may be the KYC validator for one of the nodes for SMS mobile Text Message, etc. Additionally, data block 410c may include C.C. transaction list 424, a field that stores the identity of extra parties that need to be informed (e.g., carbon copied/ C.C.'d) about a confirmed delivered session. C.C. transaction list 424 may be stored per client, node, or both as shown in FIG. 4, in which case the parties that are notified about a session do not depend on which of the nodes is involved in a transaction. C.C. transaction list 424 may also be stored per node (e.g., as part of node information 416). In that case, different parties may be notified of sessions, dependent on which of the nodes is involved in a session. The entries in C.C. transaction list 424 may specifically identify the parties that are to be notified and may include additional identifiers associated with a session.

Per-node KYC status 416 may be established by a KYC validator 444 listed in KYC validator table 440. Further, KYC validator table 440 may include a pointer 442 which may identify each KYC validator listed in KYC validator list 444. Each KYC validator 444 may be approved by a session validator 454 in operator node table 450 (e.g., a neutral registry) for a corresponding session 452. Operator Node table 450 may store, for each session validator 454, a public key 455 that may be employed by other parties to verify the authenticity of data messages received from Operator Node validator 454. Further, operator node table 450 includes a list of pointers 456 which are linked with pointers 442 such that every validator 454 may be linked with a group of approved KYC validators in KYC validator 444 for a session 452. For example, for TF SMS Text Messaging, the Toll Free Administrators may serve as the session validator, and Verizon and British Telecom may be among approved KYC agents. In some aspects, Operator node table 450 may be a global data structure that is not linked to a specific node or data block 410c. KYC validator table 440 may store a public key 445 for each KYC validator 444 that may be employed by other parties to verify the authenticity of data messages received from KYC validator 444. Other methods for KYC validation may include a PIN (Personal Identification Number). This validation may be used in place of the public/private key assignment.

Figure 5:
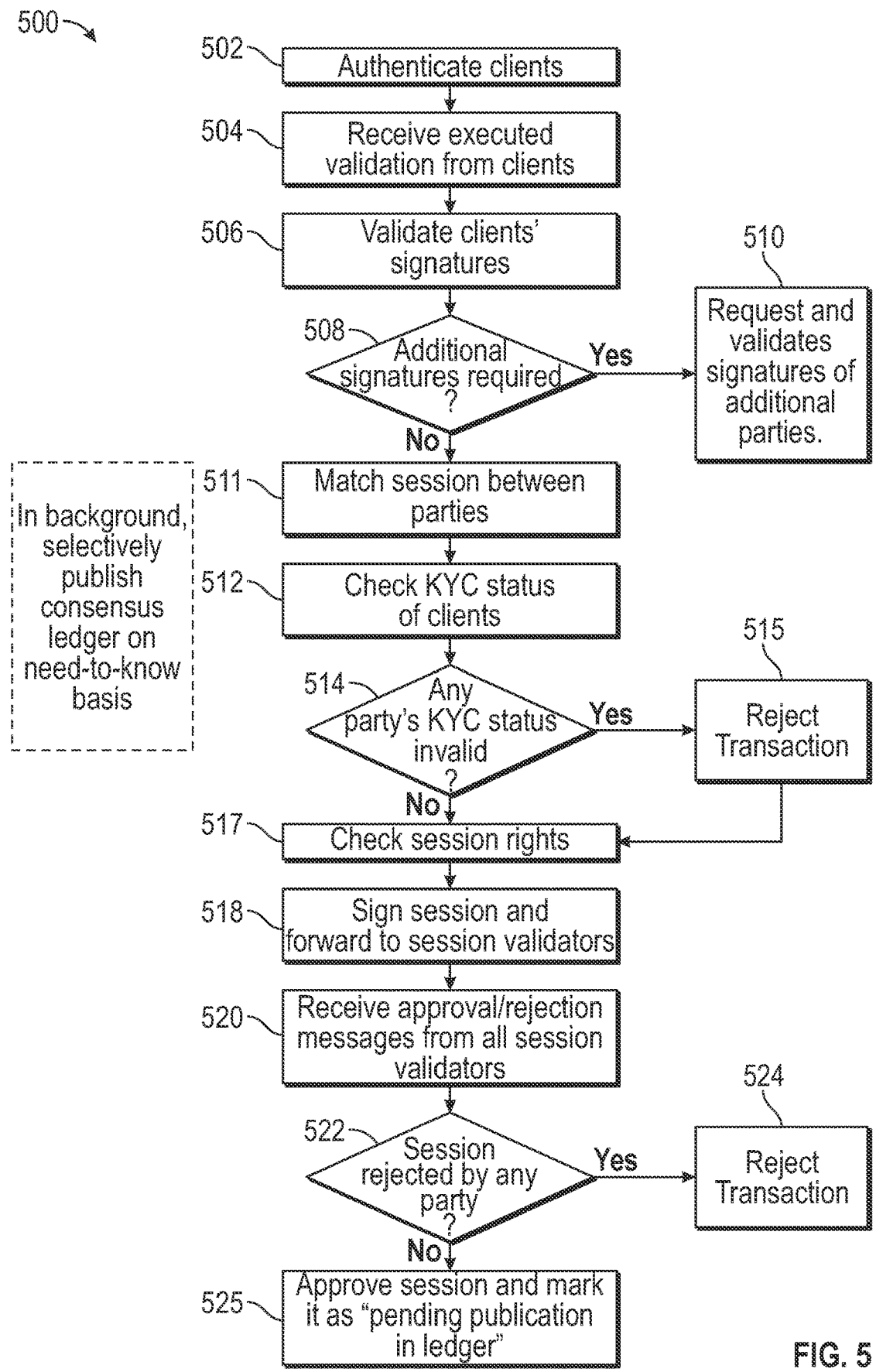
FIG. 5 is a flowchart of an embodiment of a method for updating a distributed ledger adapted for use in settling communications transactions based on data messages received from validation servers that each store partial, redundant copies of the ledger.

FIG. 5 shows a flowchart of an embodiment of a method 500 for updating a distributed ledger (distributed ledger 200 in this particular embodiment) based on data messages received from session validation servers (e.g. session validation servers 130-132) that each store partial, redundant copies of the ledger 200. In method 500 at step 502, clients may receive input from parties involved in a communication session (e.g., clients 112 or 122). The remaining steps of method 500 may be performed by a ledger administration network (e.g. the embodiment described in FIG. 3). As discussed in relation to FIG. 3, the successful processing of a session may have ledger administration server 102 receive validations from session validation servers (e.g., session validation servers 330) as well as KYC verifications (e.g., from KYC validation server 360).

Method 500 may start at step 502 by the ledger administrative server (or operator node server) receiving authentication requests from nodes that are parties in a session. The access of the nodes to ledger administration network 300 may be protected by a two-factor authentication mechanism or by providing a username and password, or a PIN combination. In some aspects, a username may specifically identify a client (e.g., client 112) and may be linked to the node of the client in the distributed ledger. The authentication procedure as well as the interface that clients use for submitting data messages with their session, requests may be part of a specially designed Application Program Interface (API). Once clients gain access to ledger administration network (e.g., ledger administration network 300 shown in this embodiment), the API used by the clients to access ledger administration network 300 may collect from the clients and may store information about the requested session, such as the smart contract involved in the sessions, the ledger session balances to be transferred or exchanged, as well as any other pertinent information needed for processing the session. In some aspects, such as in a client to client, where the transaction involves multiple clients, the clients may also input information about other parties (e.g., their respective public key or smart contract information) that have previously agreed to be part of the smart contract by other means (e.g., by voice, by e-mail or through a conventional service provided by a fixed or mobile operator). Each of the clients involved in a session may individually append their respective signatures to the data messages. The signatures identify the parties associated with a session request as well as session details. Clients may generate their respective signatures by hashing the data corresponding to the details of the session requested by said client, and then by encrypting the resulting hash using the client's private key to obtain an encrypted signature, as will be described in more detail in connection with the embodiment described in FIG. 6.

At step 504 in method 500, a ledger administrative server (or operator node server) may receive a plurality of session requests by clients that have been authenticated by a ledger administration server (e.g., ledger administrative server 310). The connection between ledger administration server and the client device that accesses ledger administration server through the API may be authenticated using conventional authentication protocols (e.g., the "Oauth" protocol). In method 500 at step 506, the ledger administrative server may validate each party's signature that is associated with a transaction request. Further, according to method 500 the ledger administrative server may determine the validity of each client's signature by decrypting the signature to obtain a hash. The hash may then be compared with another hash obtained independently from the data message (e.g., as described in connection with the discussion of FIG. 6).

In method 500, if ledger administrative server 310 determines that the signatures are valid, method 500 may determine at step 508, whether the processing of the session requires any additional signatures. For example, KYC policies for a given client may require that other parties confirm sessions requested by a specific individual by adding extra signatures in extra signatures field 422 of data block 410c as described in connection with the embodiment described in FIG. 4. If additional signatures are required, ledger administration server 310 may collect and validate the additional signatures at step 510, prior to continuing with method 500. Ledger administration server 310 may also check if any of the parties of a session have not yet provided their signatures. For example, a session may involve multiple clients, not all of which may have provided signed data messages at step 504. Accordingly, ledger administration server 310 may identify the type of session requested and send a request for any missing signatures. For instance, in a multiple node session, where the session involves multiple clients, the session information sent by a client using the API also contains information about the other parties that may take part in the session. In some embodiments, these parties have previously agreed to be part of the smart contract by other means (e.g., by voice, by a conventional fixed or mobile operator, or processing platform) and are known to the other participants in the session. At step 510, ledger administration server 310, may add the identities of the other participants (e.g. the participants in C.C. session list 424) and their signatures (e.g., extra signatures 422). These data tables may start to be filled when the data from the first client requesting the multiple party node is received and authenticated in step 504 by ledger administration server 310. Then, extra signatures table 422 is marked as incomplete, the identity of the parties listed in C.C. session list 424 is checked and matched to extra signatures table 422 one by one, as said parties log into the system and submit a request for the same session. When all parties have agreed to the session, extra signatures table 422 is marked as complete, and method 500 continues to the next step. Ledger administration 310 may implement a time-out mechanism using hardware or software control that sets a window of time for step 510, in which all the parties in a session agree to be part of it. In this way, method 500 may verify that all of the parties involved in a session have given authorization to be part of it, and have mutually acknowledged the other parties taking part in the same session.

After requesting all the needed signatures for the session, in method 500 at step 511, ledger administrative server 310 may match session between parties. For example, ledger administration server 310 may process a session by identifying a party that has submitted a session to connect a first session in exchange for a second session. Ledger administration server 310 may process the session of that party and match it with another session that has been received by another party seeking to deliver the second session in exchange for the first session. In some cases, it may not be necessary to match sessions between parties, such as for consumer to consumer sessions, or for sessions in which two or more parties have agreed beforehand to carry out a perpetual smart contract for sessions.

In method 500 at step 512, ledger administrative server 310 (or session validation servers) may check the KYC status for each client. In some aspects, such a KYC check may be mandated by law, and ledger administration server 310 may be configured to perform such a KYC check prior to approving any modification to the distributed ledger. In order to complete the KYC check, ledger administration server 310 may check that node details linked to each client account in the ledger have been verified and signed by a KYC validator. A list of approved KYC validators may be stored in KYC status database 322 (maintained by ledger administration server 310). A data structure similar to session table 450 and KYC validator table 440 may be used, as discussed in connection with FIG. 4.

In method 500 at step 514, ledger administration server 310 (or session validation servers) may determine whether the KYC status of all parties is valid. If any of the parties is associated with an invalid KYC status, method 500 may reject the session as a whole and may prevent any of the parties' ledger session balances from being updated. Otherwise, method 500 may determine at step 517 whether the ledger session balance stored at ledger administration server 310 is greater than or equal to the available amount of the session count. If ledger administration server 310 determines that the ledger session balance is sufficient, method 500 causes ledger administration server 310 to sign the session at step 518 and forward a data message with the session details to session validators (e.g., session validation server 330). Conversely, if ledger administration server 310 determines that the ledger balance is less than the available session amount, the transaction may be rejected. In some aspects, ledger administration server 310 may determine to which session validation servers the session needs to be forwarded. For example, ledger administration server 310 may include a database that stores a list of session validators (e.g., session validator table 450). Ledger administration server 310 may determine the balance involved in the session, and forward data messages with session details to the validators obtained from session table 450.

At step 520 in method 500, ledger administration server 310 may receive either an approval or a rejection from the session validators associated with the session. The approval mechanism of a session by a session validator may include the validation of the signatures of both the clients or proxies involved in the session as well as the validation of the signature associated with ledger administration server 310. After the signatures have been validated, the session validation servers may compare the proposed session amount against the currently available balance, or "available balance" of each client. The available balance of a client for a given session may correspond to the amount of the last published session ledger balance for that client, minus a cumulative balance of all sessions marked as "pending" or "available." Pending sessions may correspond to fully signed, approved outgoing sessions that have not been included in the latest ledger session balance update received from ledger administration server 310. Available sessions may correspond to outgoing sessions that have been partially signed and not yet confirmed by ledger administration server 310. If this available balance is sufficient to cover the requested session, the amount required for such a session is added to the "available" amount, to prevent double-spending or "replay." Session validation servers may further perform any additional non-public checks as required by regulation or law. Furthermore, session validation servers may perform an additional layer of KYC validation. At this point, if all checks pass, the session validation servers sign the session, and forward it to ledger administration server 310.

At step 522 in method 500, ledger administrative server 310 may determine whether any of the session validation servers has rejected the transaction or if any of the KYC checks has failed. If so, at step 524, ledger administration server 310 may determine that the communication session should be rejected. Conversely, according to method 500, ledger administration server 310 may determine that the session is eligible for approval. At step 526, ledger administration server 310 may determine whether the session should be approved and marked for publication in the ledger.

Ledger administration server 310 may employ a consensus process that processes the fully approved messages received from the session validation servers in order to include them in a new version of the ledger. Ledger administration server 310 may execute the consensus process periodically. In one example, the consensus process executed by ledger administration server 310 may determine to include those sessions if all of the messages received from the session validation servers approve including those sessions. Otherwise, if the consensus process determines that at least one of the messages rejects those sessions, the proposed new ledger may be rejected in its entirety and the process repeated with an updated set of sessions. In another example, the consensus process executed by ledger administration server 310 may only require that at least a certain fraction of the data messages received from the session validation servers approves the new ledger. For instance, the consensus process may determine that the new ledger for each session should be approved if more than 80% of the messages received from the session validation servers for that session approve the transaction. In the candidate list of sessions to be included in the new ledger, every session may have an associated "session ID" and may be listed alongside a hash of the signed session message. This hash may be used by the session validation servers to quickly compare with sessions which it has approved in order to identify all the participants (e.g., clients and validators) in the session and the amounts and nodes of the sessions. In one example, a process of harmonizing a new ledger may be used to consolidate updates to the distributed ledger at each of the session validations servers, e.g., in order to remove the "pending" or "unavailable" status for completed transactions and to update smart contract database 336.

Between steps 518 and 52, method 500 may further include performing anti-money laundering (AML) checks. For example, the session validation servers (e.g., session validation server 330) may employ processor 334 to collect session histories and generate statistical data about node activity. Session validation server 330 may further use a detection process to analyze the collected data and flag activity that matches suspicious patterns or other types of irregular node activities. Responsive to flagging an activity as suspicious, session validation server 330 may generate a warning message. The warning message may cause the KYC status of the affected node to be changed to "not approved," thus blocking sessions relating to this node from being approved.

According to method 500, the distrusted ledger may be published on a need-to-know basis. An important aspect of the present disclosure is the ability of a ledger administration network (e.g., network 300) to maintain a distributed ledger without revealing sensitive information to the general marketplace, while providing regulators with the necessary transparency to validate sessions. In some aspects, the full distributed ledger is stored by a ledger administration server and redundant partial copies are kept by session validation servers, operator node servers, and/or KYC validation servers. The data contained in the redundant copies of the distributed ledger stored at a ledger administration server, and at the session validation servers, is kept synchronized, and the circuitry required for communication between session validation servers and the ledger administration server may be designed such as to avoid latency between session publication in the distributed ledger, and the process of cross-validation of the full distributed ledger with the partial fragments kept by the session validations servers, operator node servers, or KYC validations servers. In some embodiments, even fully-redundant copies of the ledger may be stored by session validation servers and the ledger administration server, thus reducing the risk of external interference or system wide malfunctions. Authentication techniques may provide that full access to the ledger session balances is only available at the ledger administration server, while session validation servers are only able to access their respective portions of the distributed ledger.

Figure 6:
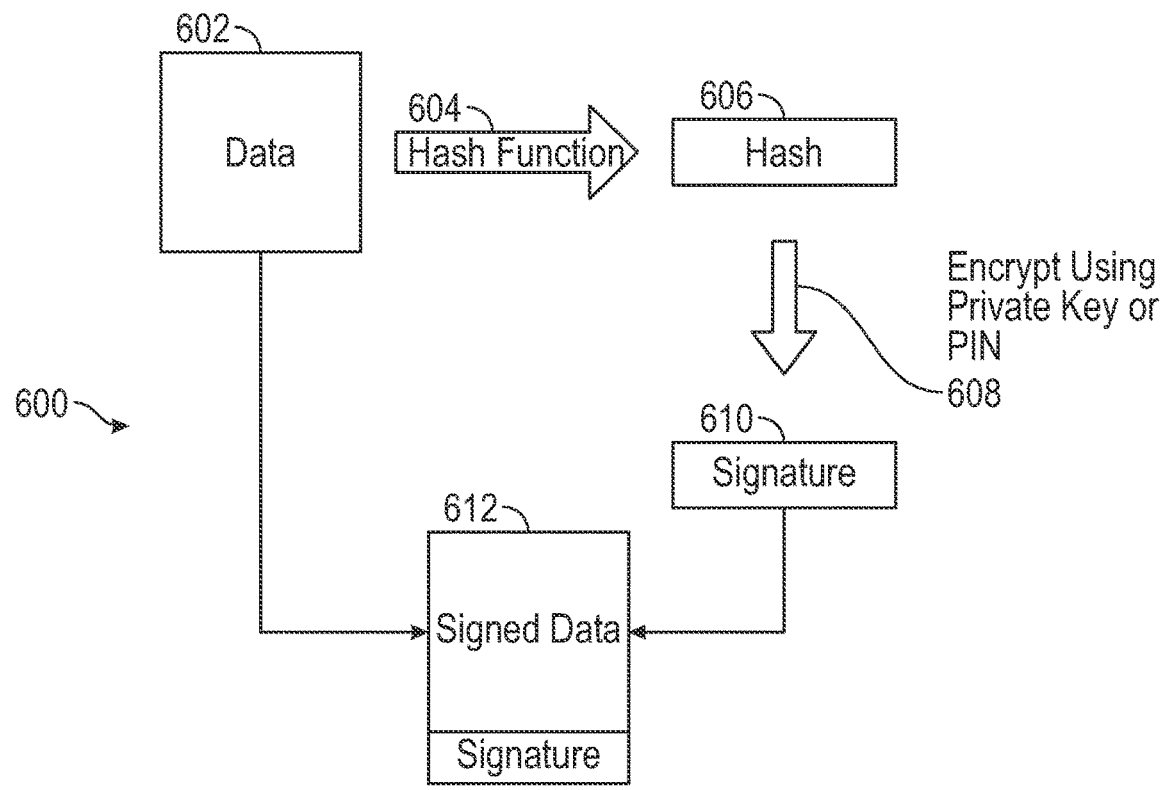
FIG. 6 is a block diagram illustrating of an authentication method using public and private keys suitable for use with the embodiment illustrated in FIG. 5.
Figure 6:
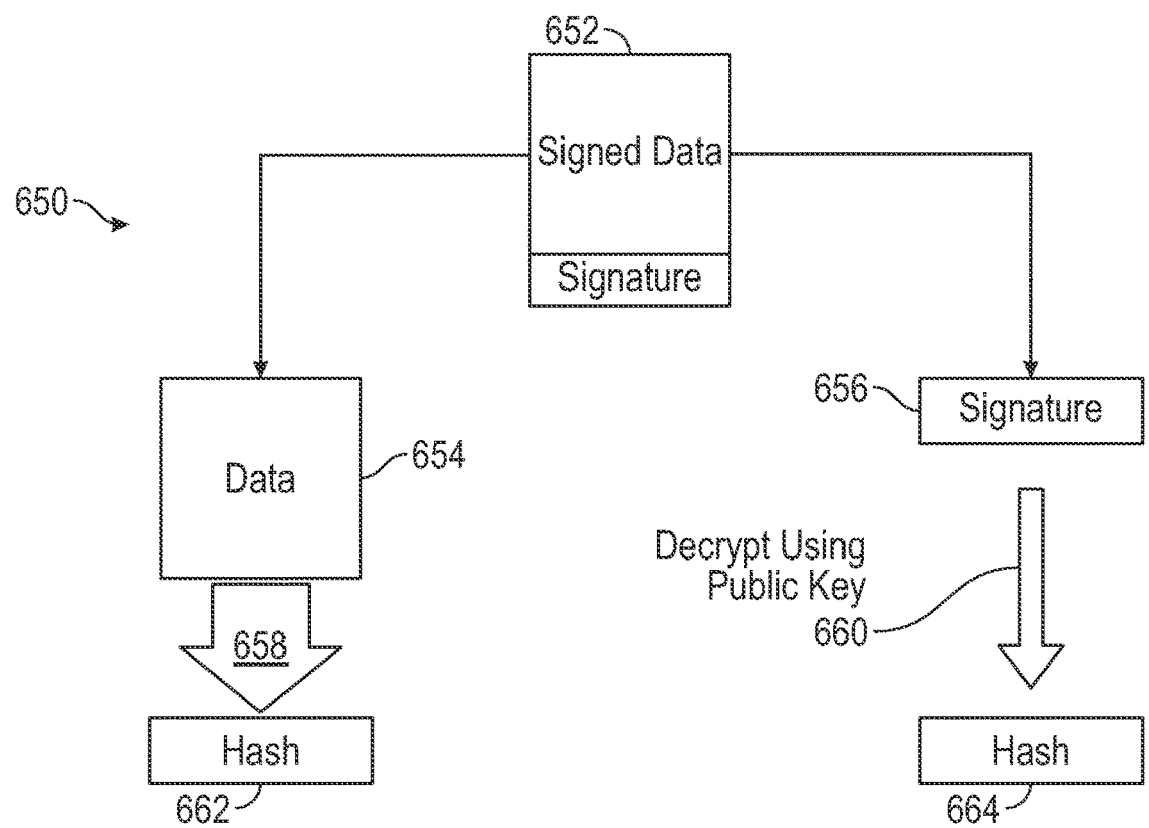

FIG. 6 is a block diagram illustrating an authentication method using public and private keys. Two interrelated high-level methods 600 and 650 jointly describe the process of authenticating a session. Method 600 details the procedure used to generate signed data by a party seeking the authentication, from a second authenticating party. Method 600 includes the original data 602 to be authenticated, a hash function 604, which processes the original data to produce a hash 606, an encrypted signature 610 generated with a private encryption key 608, and a new data structure 612 that results from appending the encrypted signature 610 to the original data 602.

The generation of the signed data, as described in method 600, may start with the hashing of the original data 602. The hashing is performed based on a hash function 604 that takes session details as input data, and outputs a unique string of data (hash) 606. The hash is then encrypted by conventional encryption methods (e.g., using RSA encryption) using a private key 608 which is only known to the party that authenticates the session. Using private key 608, a string of data is generated, corresponding to an encrypted signature 610. Signature 610 may then be appended at the end of the original data 602, or it may be included as a header. The resulting signed data 612 is sent to the party seeking to authenticate the origin of the data 612.

Method 650 describes the authentication procedure followed by an authenticating party of the signed data 612 generated by the process described in method 600. It includes the received signed data 652, which is composed of the original data 654 of the session, and the encrypted signature 656 generated in accordance with method 600. Method 650 also includes a public key 660, used for decryption of the signature 656, a hash function, 658, and two hashes 662 and 664, generated by the two alternate mechanisms described below.

Signed data 652 received by the authenticating party is separated into two fragments. The first data fragment 654 corresponds to the original data 612 describing the session solicited by the party seeking authentication. The second fragment is an encrypted signature 656. Once isolated, the session data 654 is hashed by the hash function 658, which is identical to hash function 604, used in diagram 600 to generate the encrypted signature 610. This produces a hash 662. The second fragment, the encrypted signature 656, is identical to 610 and is decrypted with a public key 660 that is in the possession of the authenticating party, which according to conventional encryption techniques is linked with private key 608. The decryption of the signature using the public key produces a second hash 664, which is compared with hash 662. The authentication is successful if 662 and 664 are identical. If this is not the case, the authentication process is marked as invalid and the requested transaction is rejected. The utilization of a PIN would be also available as a security measure.

Figure 7:
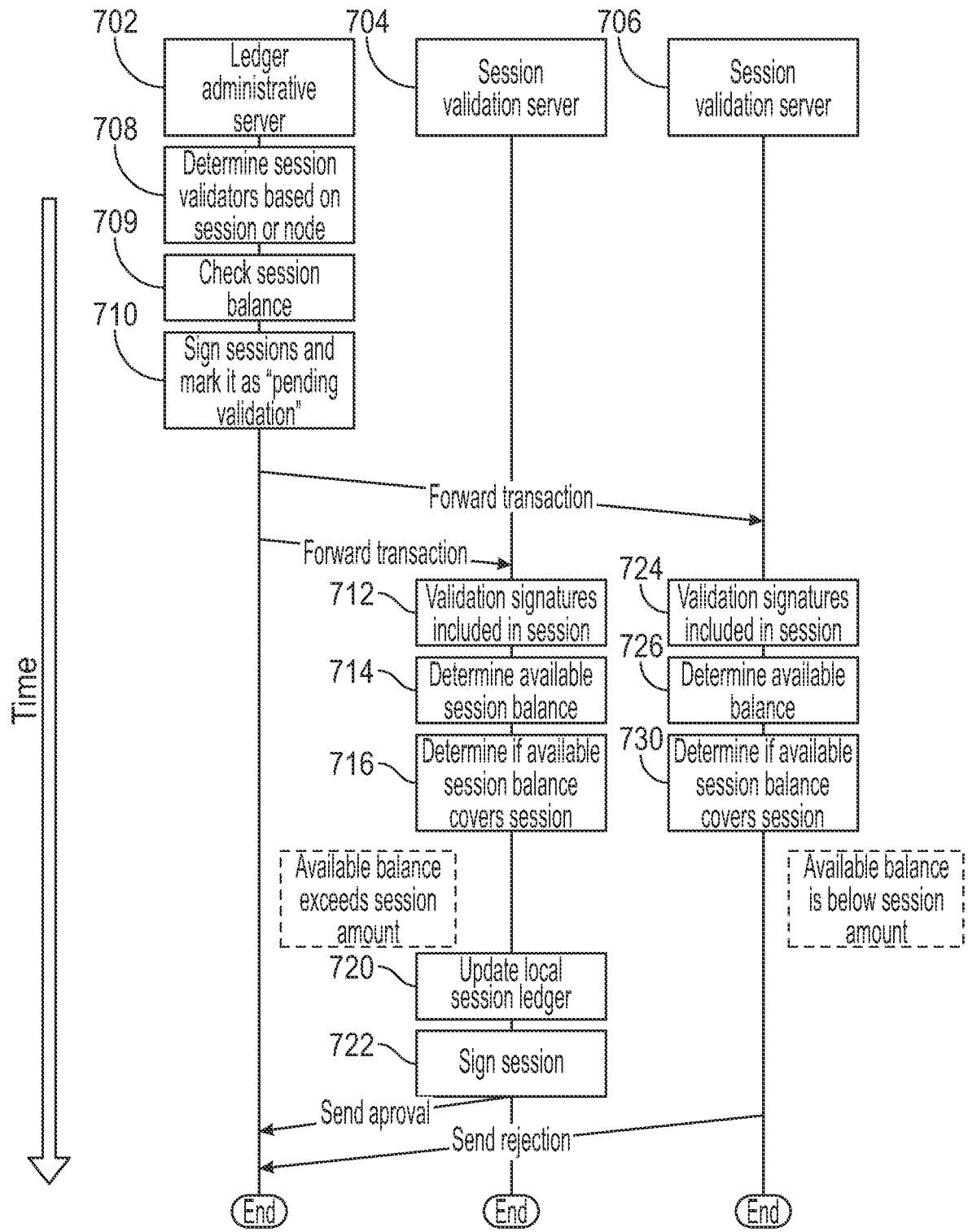
FIG. 7 is a timing diagram for an exemplary embodiment of a method for processing sessions by a ledger administration server and two session validation servers.

FIG. 7 is a timing diagram for a method 700 of processing sessions by a ledger administration server 702 and two session validation servers 704 and 706. These session validation servers may validate sessions for two different nodes. For example, session validation server 704 may validate sessions for use of SMS text messaging, and session validation server 706 may validate sessions for use of voice. Session validation servers 704 and 706 may validate sessions by verifying that the sessions have been properly authenticated and by determining that the session(s) are below an available session balance in the smart contract, reduced by pending or unavailable sessions. Method 700 illustrates the process for a defined session, for instance, SMS Text Message and Voice. Time has been incorporated in method 700 (represented by the arrow) along the vertical axis, such as to illustrate the timing of data exchanges between servers in the ledger administration network. The steps depicted in the embodiment of method 700 are executed following the validation of the signatures of the parties involved in a session by a ledger administration server, (e.g. as described in steps 506 through 510 in FIG. 5).

In method 700, the servers of ledger administration network are represented by ledger administration server 702, session validation server 704, and session validation server 706, each of which may provide validating input to determine the processing and approval of the session. The exchange of messages between the different servers of method 700 may be implemented based on the network architecture illustrated in FIG. 3. In particular, the circuitry of the network interfaces 316, 332 and 342 may be used in combination a two-stage authentication method (e.g. methods 600 and 650) for the exchange of messages between ledger administration server 702 and session validation servers 704 and 706. The circuitry of the network interfaces may work in conjunction with a machine-to-machine authentication protocol such as "Oauth" to prevent external interference with the communication between servers. This may be important given the possible large geographic spread of ledger administration server 702, session validation server 704 and session validation server 706.

In method 700 at step 708, ledger administration server 702 determines the node(s) associated with the communication session. Once this list of nodes has been identified, the list may be compared with a session table (e.g. table 450) in order to determine the identity of the session validation server for each session to be exchanged in the session. Similar to step 517 discussed in FIG. 5, ledger administration server 702 at step 709 may further determine whether the ledger session balance stored at ledger administration server 702 is greater than or equal to an available amount required by the session. If ledger administration server 702 determines that the session balance is not sufficient, ledger administration server 702 may reject the session. Otherwise, ledger administration server 702 may sign the session and mark it as "pending validation" at step 710. A signature process (e.g., method 600 described in FIG. 6) may be performed by ledger administration server 702. The data 602 in this case, may contain as a header the signed data block 612 which may be sent by the API running in the device that the client used to request the session. This data block may be signed at step 710 by ledger administration server 702 and the transaction may be marked as "pending validation" and forwarded to a session validation server.

Once the information is received by session validation server 704 (e.g., the server validating SMS text messages) at step 712, the signatures of the clients and the signature of ledger administration server 702 are decrypted and verified. The decryption and validation of the signatures and the verification of the integrity of the data describing the session may follow process 650 as described in FIG. 6.

Session validation server 704 then, at step 714, calculates the available balance for a given session channel of the client. The available session balance per client per node is the balance of the last published session balances in the ledger for a given client, denoted as the "latest published ledger session balance", minus the amount for "pending sessions", which are sessions that have been approved, validated and fully signed but that have not been included in the last published distributed ledger, minus the amount for "reserved" sessions, which are sessions that have not been marked as completed but have been partially signed. Pending and reserved sessions may be moved to the ledger session balance once an updated ledger including the last session ID is published by ledger administration server 702.

At step 716, session validation server 704 determines if the available session balance calculated at step 714 is greater than the amount of the requested session. In that case, session validation server 704 allows the session to continue.

At step 720, if the available balance is greater than or equal to the amount of the current session request, session validation server 704 updates the local session ledger to reserve the session amount and update the available session balance. The swift or immediate update of the available balance may be an important safeguard against "double spending" or "replay" attempts.

At step 722, after updating the local ledger of session validation server 704 (which for this example is using SMS Text Messaging), session validation server 704 signs and sends a validation approval message to ledger administration server 702. The approval message may include an acknowledgment flag that marks the session validation process as successful.

At step 710 a second message is sent by ledger administration server 702 to session validation server 706, which in this example, is the server validating the voice portion of the session. Steps 724-730, performed by session validation server 706, may be similar to steps 712-716 performed by session validation server 704. In this example, step 730 performed by session validation server 706 may determine that the available balance of the client in voice is less than the amount of the requested session. Following this determination, session validation server 706 signs and sends a rejection message to ledger administration server 702.

After receiving an approval message from session validation server 704 and a rejection message from session validation server 706, ledger administration server 702 determines that no consensus has been reached and rejects the session. In another scenario, in which all the session validation servers have validated the session, the session is marked as "pending publication" as described at step 526 in FIG. 5.

Some embodiments of the present disclosure may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof. Some embodiments may be implemented using existing parallel, distributed computer processing and distributed data storage frameworks (e.g., Hadoop).

Some embodiments include a computer program product comprising a computer readable medium (media) having instructions stored thereon/in and when executed (e.g., by a processor), perform methods, techniques, or embodiments described herein; the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media, may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Figure 8:
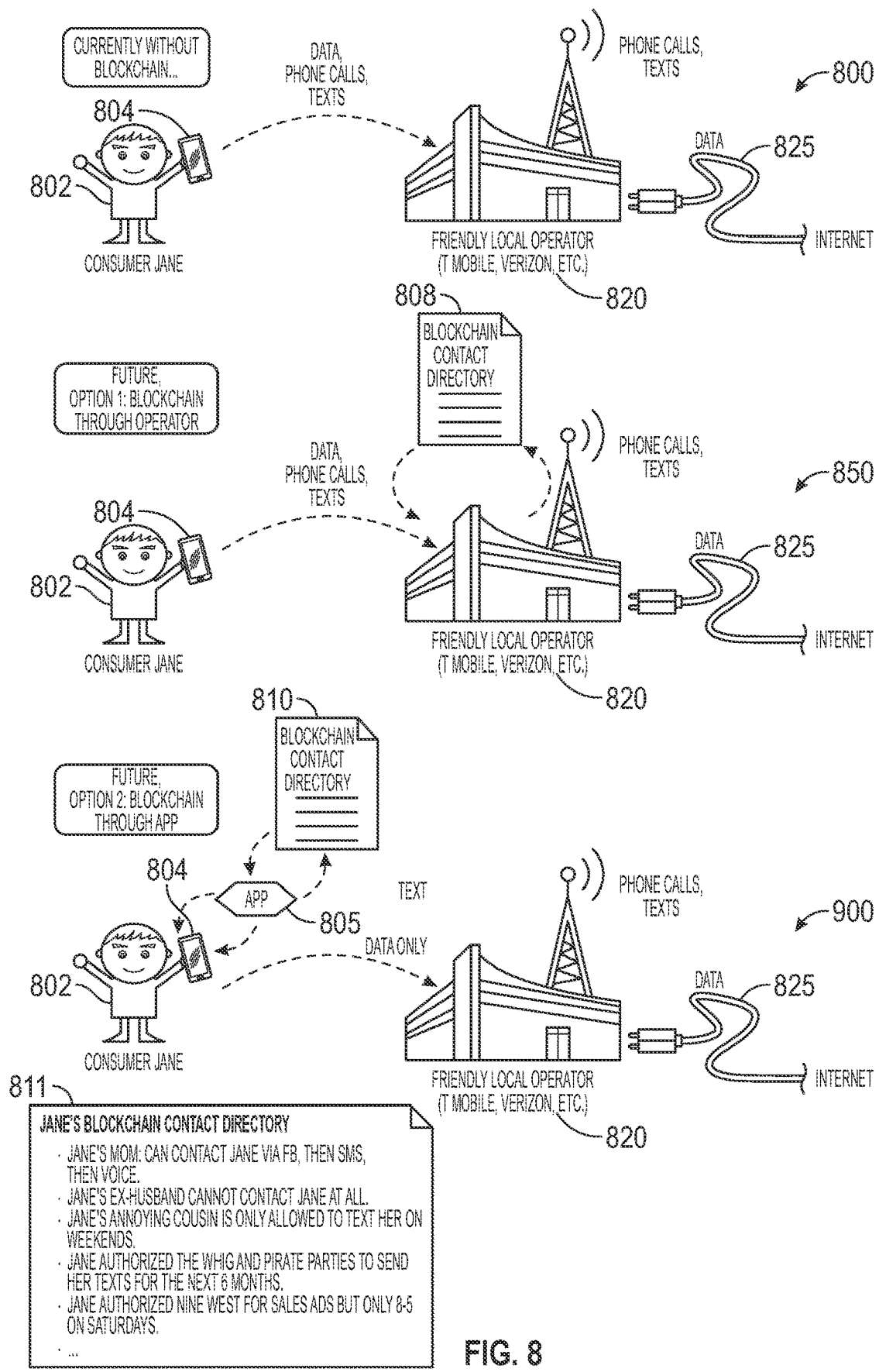
FIG. 8 is a schematic diagram illustrating the use of the systems and methods of the present disclosure.

FIG. 8 is a schematic diagram illustrating the use of systems and methods described herein. Current communications method 800 illustrates user 802 utilizing client 804 to initiate a communications session with local operator 820. Local operator 820 maintains private records of user 802 and client 804 (smart phone) and communicates with other local operators (not illustrated) over network 825 to establish the communications session. Charges and rules for the communications session are implemented within the systems and records of local operator 820 with respect to client 804; and in the records and systems of the other local operator(s) with respect to the other client(s) participating in the communications session. Method 800 represents the current way communications sessions may be authenticated, with the local operators acting as escrow agents to prevent double-spend issues and meet regulatory requirements such as KYC requirements.

Centralized ledger method 850 utilizes methods and systems according to the present disclosure. User 802 uses client 804 to request a communications session with local operator 820. As opposed to validating the requesting session via private systems and records, local operator 820 sends messages to a session validation server (not illustrated) which validates and authorizes the session through public, distributed ledger 808. In centralized ledger method 850, the rules, regulatory requirements, and validations occur on a distributed ledger 808 maintained through a plurality of servers including ledger administrative servers (not illustrated) and session validation servers (not illustrated) as described herein.

In distributed ledger method 900, user 802 still requests a communications session through client 804. However, client 804 includes an application capable of maintaining a private ledger 810 that represents the portion of a larger distributed ledger (not illustrated) and also contains rules 811 for communications sessions authorized by user 802. Validation of communications sessions is performed on a peer-to-peer basis with app 805 communicating with the larger distributed ledger to initiate and receive communications sessions subject to rules 811. In such an embodiment ledger administration servers (not illustrated) may be operated by any third party. Local operator 820 may provide session validation servers to validate sessions requiring the use of the operator's infrastructure, but need not otherwise participate in maintaining the distributed ledger. In this embodiment, user 802 controls the rules regarding communications sessions in which client 804 will participate, thus enabling user 802 to, for example, control the parties who may communicate with client 804 or require credits (based on identity, session type, or other rules) prior to accepting a communications session. The use of a distributed public ledger and a private ledger in connection with the systems and methods described both improves the speed at which communications sessions are validated, and places user 802 in control of the conditions under which third parties may communicate with client 804. The role of local operator 820 in such embodiments may be limited to providing data bandwidth only.

Distributed ledger method 900 also enables a greater degree of user-controlled sharing of services available through client 804 by user 802 through smart contracts. This is in part because the smart contract and method of executing it resides on the client 804 itself (where they can control the resources directly), and not at an aggregation point such as server managed by operator 820. For example, user 802 could use app 805 to create a smart contract that allows shared access to her Verizon handset services such as text messages used for two factor authentications to other communications endpoints (not shown) on or off of that service providers network. In this way, user 802 could receive such texts on other clients on other networks when she so chooses. App 805, which is accessible through client 804, allows user 802 to adjust smart contract(s) to access these services when user 802 has client 804 in an inactive or specified mode, thereby allowing the services to follow user 802 as opposed to following client 804.

Similarly, user 802 could establish smart contracts that enabled sharing of other resources of client 804, such as computing power. For example, user 802 could establish a smart contract that allowed user 802 (or another) to access to client 804's computing and physical power resources (such as processing power and/or memory) for distributed computed tasks such as managing a blockchain such as ledger 808. The smart contracts may enable other communications endpoints requiring such computing or physical power resources to compensate user 802 for access to these resources. App 805 may also allow user 802 to adjust such smart contract(s) to access these services when client 804 is in an inactive or specified mode, thereby taking advantage of otherwise unused device resources. Any resource of client 804 (e.g. processor, memory, screen, sensors, speaker) can be shared this way through the use of ledger 810.

Other embodiments and variations of the systems and methods described herein will be apparent to those of skill in the art in light of this disclosure, which is not intended to be limited to the embodiments described herein.

I claim:

1. A system comprising:
a client configured with an application and rules for communications sessions authorized by a user, wherein the application maintains a private ledger that represents a portion of a distributed ledger that is maintained on a ledger administrative server, and communicates with the ledger administrative server to initiate and receive communications sessions subject to the rules for communications sessions authorized by the user, wherein the ledger administrative server communicates with a session validation server to initiate and receive the use of communication infrastructure for the communications sessions by sending confirmation messages to the session validation server and receiving approval messages from the session validation server, and wherein the session validation server validates the use of communication infrastructure by receiving confirmation messages from the ledger administrative server sending approval messages to the ledger administrative server, further wherein the session validation server does not have access to the rules for communications sessions authorized by the user.

2. The system of claim 1 wherein the client is a smartphone.

3. The system of claim 1 wherein the client is a tablet.

4. The system of claim 1 where the client is a desktop or laptop computer.

5. The system of claim 1 wherein the client is a server.

6. The system of claim 1 wherein the ledger administrative server, and the session validation server are operated by different parties.

7. The system of claim 1 wherein the communications sessions comprise social media messaging, text messaging, telephone calls, advertising messaging.

8. The system of claim 1 wherein the use of communication infrastructure comprises data bandwidth.

9. The system of claim 1 wherein the rules for communications authorized by the user comprises a smart contract.

10. The system of claim 9 wherein the smart contract allows shared access to the user's text messages.

11. The system of claim 9 wherein the smart contract enables sharing the computing power of the client.

12. A method for sharing access to a client by an application included on the client comprising:
receiving and storing a smart contract for sharing access to the client from a user;
communicating with a ledger administrative server to initiate and implement the sharing access to the client according to the smart contract, wherein the ledger administrative server is configured to communicate with a session validation server to initiate and receive the use of communication infrastructure for sharing access to the client by sending confirmation messages to the session validation server and receiving approval messages from the session validation server, and wherein the session validation server validates the use of communication infrastructure by receiving confirmation messages from the ledger administrative server sending approval messages to the ledger administrative server, further
wherein the session validation server does not have access to the smart contract.

13. The method of claim 12 wherein the sharing access by the client is sharing access to the computing power of the client.

14. The method of claim 13 wherein the access sharing by the client is sharing access to the client's text messaging services.

* * * * *